United States Patent
Nakata et al.

(10) Patent No.: US 8,361,343 B2
(45) Date of Patent: *Jan. 29, 2013

(54) NEMATIC LIQUID CRYSTAL COMPOSITION AND BISTABLE NEMATIC LIQUD CRYSTAL DISPLAY

(75) Inventors: Hidetoshi Nakata, Kitaadachi-gun (JP); Takeshi Kuriyama, Kitaadachi-gun (JP); Kiyofumi Takeuchi, Kitaadachi-gun (JP); Haruyoshi Takatsu, Kitaadachi-gun (JP); Daniel Stoenescu, Palaiseau (FR); Jean-Claude Dubois, Bullion (FR); Ivan Dozov, Orsay (FR)

(73) Assignees: DIC Corporation, Tokyo (JP); Nemoptic, Les Hameaux (FR)

( * ) Notice: Subject to any disclaimer, the term of this patent is extended or adjusted under 35 U.S.C. 154(b) by 241 days.

This patent is subject to a terminal disclaimer.

(21) Appl. No.: 12/451,075

(22) PCT Filed: May 16, 2008

(86) PCT No.: PCT/JP2008/059493
§ 371 (c)(1),
(2), (4) Date: Oct. 26, 2009

(87) PCT Pub. No.: WO2008/143334
PCT Pub. Date: Nov. 27, 2008

(65) Prior Publication Data
US 2010/0201930 A1    Aug. 12, 2010

(30) Foreign Application Priority Data
May 17, 2007   (JP) ................. 2007-132117

(51) Int. Cl.
C09K 19/00 (2006.01)
C09K 19/02 (2006.01)
C09K 19/06 (2006.01)
C09K 19/52 (2006.01)
G02F 1/1333 (2006.01)

(52) U.S. Cl. .......... 252/299.6; 252/299.01; 252/299.61; 252/299.63; 428/1.1; 428/1.3; 349/1; 349/56; 349/123

(58) Field of Classification Search ............. 252/299.01, 252/299.6, 299.61, 299.63; 430/20; 428/1.1, 428/1.3; 349/1, 56, 123
See application file for complete search history.

(56) References Cited

U.S. PATENT DOCUMENTS

| | | | |
|---|---|---|---|
| 5,995,173 A | 11/1999 | Barberi et al. | |
| 6,327,017 B2 | 12/2001 | Barberi et al. | |
| 7,067,180 B2 | 6/2006 | Lamarque-Forget et al. | |
| 7,115,307 B2* | 10/2006 | Dubois et al. | 428/1.3 |
| 7,335,405 B2* | 2/2008 | Dubois et al. | 428/1.3 |
| 2003/0001138 A1 | 1/2003 | Kubo et al. | |
| 2004/0188654 A1 | 9/2004 | Dubois et al. | |
| 2011/0211148 A1* | 9/2011 | Nakata et al. | 349/123 |

FOREIGN PATENT DOCUMENTS

| | | |
|---|---|---|
| EP | 0773468 A1 | 5/1997 |
| EP | 1259854 A1 | 11/2002 |
| FR | 2657699 A1 | 8/1991 |
| FR | 2663770 A1 | 12/1991 |
| FR | 2740893 A1 | 5/1997 |
| FR | 2740894 A1 | 5/1997 |
| JP | 09-274205 A | 10/1997 |
| JP | 2005-133057 A | 5/2005 |
| WO | WO-2004099343 A1 | 11/2004 |

OTHER PUBLICATIONS

G P. Bryan-Brown et al., "Weak surface anchoring of liquid crystals," Nature 399, 1999, pp. 338-340.
A. Rapini et al., "Distorsion d'une lamelle nématique sous champ magnétique conditions d'ancrage aux parois," J. Phys. (Fr) C4, 30, 1969, pp. 54-56.
International Search Report mailed Aug. 29, 2008 and Written Opinion of the International Searching Authority issued on PCT/JP2008/059493.

* cited by examiner

*Primary Examiner* — Geraldina Visconti
(74) *Attorney, Agent, or Firm* — Edwards Wildman Palmer LLP; James E. Armstrong, IV; Nicholas J. DiCeglie, Jr.

(57) ABSTRACT

The present invention provides a nematic liquid crystal composition suitable for a bistable nematic liquid crystal display. A bistable nematic liquid crystal display having a wide nematic phase temperature range and operating temperature range can be obtained by using a nematic liquid crystal composition comprising at least 20% by weight of a specific liquid crystal compound (A) having a polar group and 5 to 50% by weight of a specific liquid crystal compound (B) not having a polar group, along with comprising, in the compound (B), at least 3% by weight of a specific liquid crystal compound having a alkenyl group.

10 Claims, 1 Drawing Sheet

NEMATIC LIQUID CRYSTAL COMPOSITION AND BISTABLE NEMATIC LIQUD CRYSTAL DISPLAY

CROSS REFERENCE TO RELATED APPLICATIONS

This application is related to co-pending application: "NEMATIC LIQUID CRYSTAL COMPOSITION AND BISTABLE NEMATIC LIQUID CRYSTAL DISPLAY" filed even date herewith in the names of NAKATA, Hidetoshi; TAKEUCHI, Kiyofumi; TAKATSU, Haruyoshi; STOENESCU, Daniel; DOZOV, Ivan; and DUBOIS, Jean-Claude as a national phase entry of PCT/JP2008/059500; which application is assigned to the assignee of the present application and incorporated by reference herein.

TECHNICAL FIELD

The present invention relates to a nematic liquid crystal composition that can be suitably applied to a bistable nematic liquid crystal display and to a bistable nematic liquid crystal display that uses the composition.

BACKGROUND ART

Liquid crystal displays (LCDs) are increasingly used in various display applications because they are thin, lightweight, and have low power consumption. Such LCDs have a structure in which a liquid crystal composition is confined between two substrates, at least one of which is transparent. The substrates are provided with an electrode layer on their internal faces (mutually facing surfaces) to impress an electric field on the liquid crystal composition and an alignment film in which an orientation treatment is performed that orients the liquid crystal. This orientation treatment serves to both orient and anchor the liquid crystal composition on the alignment film.

By applying an electric field exceeding the Freedericksz transition voltage between the electrodes of the two substrates, the orientation of the liquid crystal composition varies under the action of the electric field. Due to birefringence of the liquid crystal composition, these orientation variations change the optical properties of the display, and moreover by using polarizing plates it functions as a display device.

Such LCDs, called "classical" LCDs, have the following characteristics:

(1) When the external electric field is switched off after displaying information, the displayed information also disappears;

(2) the alignment film functions to align the liquid crystal molecules to be parallel with respect to the alignment film and has an extremely strong anchoring force with respect to the liquid crystal molecules. For that reason, even when an electric field is applied, the liquid crystal molecules in the vicinity of the alignment film basically maintain their parallel orientation with respect to the alignment film without reorienting to the direction of the electric field; and (3) when the field is switched off, the state prior to the electric field application is reverted to.

A large amount of work has been done to improve the performances of the liquid crystal composition of classical LCDs by optimizing the physical properties including the temperature range, viscosity, elasticity, birefringence, dielectric anisotropy, Freedericksz transition voltage, etc. It is nearly impossible to optimize the above-mentioned characteristics with a single compound, and so mixtures combining a plurality of compounds are required (see Handbook of Liquid Crystals, Wiley-VCH Weinheim (1998)).

Furthermore, for these classical LCDs, the anchoring force with respect to the liquid crystal molecules of the alignment layer need not be strictly defined, with all that is required is that this anchoring be "strong", in other words, greater than a given limiting value ($L_z$<15 nm, with $L_z$ being defined below). Research has been conducted on this problem in obtaining strong anchoring in an alignment film, with several known alignment layer materials being used to provide strong anchoring (see Liquid Crystals—Applications and Uses, World Scientific Publishing Co. Pte. Ltd. Singapore (1990)).

In recent years research has been conducted on a new generation of nematic displays called "bistable" nematic displays. In these displays, the liquid crystal molecules have two stable textures without any applied voltage. The voltage is only applied for the time necessary to switch between these two orientation states. There is thus no need to keep applying a voltage in order to maintain the display. Due to its operating principle, this type of display consumes an amount of energy proportional to the number of image changes. Thus as the frequency of image changes drops, the power necessary for operation of the display tends towards zero. This type of display would therefore be extremely effective for mobile devices in which low power consumption is required.

Two kind of bistable displays have been proposed where the stable states are stabilized by the orienting film on the substrates. One kind uses orienting films which orient the molecules in two directions, i.e. bistable orienting films, the other kind uses more simple orienting films which orient in one direction only, i.e. monostable orienting films. The switching between the two stable states of these displays is obtained by breaking the anchoring of the molecules at least on one orienting film: an applied field put the molecules on the surface in a direction where the surface torque is zero and the energy maxima. After removing the field the molecules close to the film return in a stable orientation driving the molecules in the bulk to one or the other stable states.

The display device developed by the ZBD Displays Ltd. (G. P. Bryan-Brown et al., Nature, 399,338 (1999)) uses a bistable orienting film: close to the film, in one stable state, the molecules are oriented nearly parallel to the substrate; in the other stable state, the molecules are nearly perpendicular to the substrate. The Orsay Solid State Physic Laboratory proposed two bistable nematic displays using bistable orienting surfaces which orient the molecules in two tilted states: French Patent Application, Publication No. 2663770 where the commutation uses a flexoelectric effect and French Patent Application, Publication No. 2657699 which uses an electrochiral effect.

Two bistable nematic displays using monostable orienting films and commuting with anchoring breaking have been developed: the Bistable Nematic (BiNem®) display by Nemoptic Ltd. in France (French Patent Application, Publication Nos. 2740893 and 2740894, and U.S. Pat. No. 6,327,017) and the SBiND display developed by LICET Ltd. in Italy (European Patent Application, Publication No. 0 773 468, U.S. Pat. No. 5,995,173 and Japanese Unexamined Patent Application, Publication No. H09-274205).

The switching principle of the BiNem® bistable display by Nemoptic Ltd. is diagrammatically shown in FIG. 1. It uses two textures one texture is uniform or slightly twisted, texture $T_0$, in which the liquid crystal molecules are approximately parallel to each other (±20°), and the other texture is $T_{180}$ that differs from the first by a twist of 180°±20°. The nematic is chiralised with a spontaneous pitch $p_0$, chosen to be close to four times the thickness d of the cell to equalize the energies of the two textures. In the absence of a voltage, these two states become minimum values in terms of energy. In the presence of a high voltage, anchoring of the molecules is broken on at least one of the substrates (specifically, on the alignment film on this substrate) and a nearly homeotropic orientation (H) of the liquid crystal molecules is obtained. This orientation state is a transition state (H), and can be switched to either of the two stable states ($T_0$, $T_{180}$). Slowly cutting the voltage can result in change to state $T_0$ by elastic coupling between molecules close to the two surfaces, and quickly cutting the voltage will lead to state $T_{180}$ by hydrodynamic coupling.

Bistable displays commuting by anchoring breaking require special properties of the liquid crystal mixture and the orienting film:

1) The anchoring on at least one alignment film has to be weak to allow the breaking by an applied field compatible with the driving electronics and the electrochemical properties of the different compounds of the nematic mixture.
2) The anchoring on the film can not be too weak because the liquid crystal textures in the stable states are stabilized by the anchoring. To maintain the textures, the anchoring torque need to be higher than the elastic torque applied on the surface by the bulk textures in the stable states.
3) The electrochemical stability of the different compounds of the mixture has to be higher to that for classical LCD displays. Indeed in classical LCD the applied voltage distorts only the bulk texture; it is close to two or three times the Freedericksz transition voltage, the minimum voltage to distort the texture maintained by the nematic elasticity. The breaking of the anchoring, taking into account the condition of the texture stability, needs a voltage almost ten times of the Freedericksz transition voltage.
4) The viscosity and the elastic constants of the mixture determine the optical response time of the displays. In the case of selection of the state by hydrodynamic coupling, these two parameters are fundamental also for the commutation.
5) A high optical refractive index anisotropy (0.14 to 0.20) has to be obtained to achieve the good contrast with a cell thickness smaller than in the classical LCD display. For a bistable display using anchoring breaking with a given mixture and a given anchoring, the voltage to break the anchoring is proportional to the thickness: to lower the voltage a small thickness is compulsory.
6) The nematic temperature range has to be wider than the targeted operating range. Indeed often the whole set of properties listed just before are not satisfied in the whole nematic range of the liquid crystal mixture: the range ($\Delta T_N$) limited by $T_{N-I}$ (the nematic-isotropic transition temperature) and $T_{X-N}$ (the transition temperature towards the nematic phase from more ordered liquid crystal phases or vitreous or crystalline solid phases). To obtain all these properties, in a technically acceptable temperature range (50° to 80° centred on the ambient temperature), the mixtures need to have a nematic temperature range $\Delta T_N$ wider than this operating temperature range.

The anchoring and anchoring breaking concepts for liquid crystal molecules on surfaces are highly technical, and they can be defined. The orientation of the liquid crystal molecules by surfaces is called anchoring. The source of anchoring is anisotropy of the interaction between the liquid crystal compound and the surface. Anchoring can be characterized by the directionality induced by the surface to which the liquid crystal molecules are adjacent and the strength thereof. This direction is called the easy axis, and the direction $n_0$ of the easy axis is defined by the azimuth angle ($\Phi_0$) and the zenithal angle ($\theta_0$) (see FIG. 2). The average orientation direction of nematic liquid crystal molecules is drawn towards the easy axis. If there is no external influence, the liquid crystal molecules are oriented parallel to the easy axis to minimize the interaction energy with the surface. This energy (anchoring energy) may be written as the following equation formula (1) as a first approximation (A. Rapini and M. Papoular, J. Phys. (Fr) C4, 30, 54-56 (1969)):

$$g(\theta, \phi) = \frac{W_Z}{2}\sin^2(\theta - \theta_0) + \frac{W_A}{2}\sin^2(\phi - \phi_0) \qquad (1)$$

where $\theta$ and $\Phi$ are the zenithal angle and the azimuth angle, respectively, of the nematic director on the surface, and $W_Z$ and $W_A$ are the surface densities of the zenithal and azimuth anchoring energies, respectively.

The azimuthal anchoring energy $W_A$ depends more on the anisotropy induced on the surface by treatments, than on the nature of the nematic materials. Even if it is compulsory in a bistable liquid crystal display to achieve a sufficient azimuthal anchoring to maintain twisted textures, we will not develop this subject.

The bistable displays commuting by anchoring breaking use more often the zenithal anchoring breaking. We will focus on this phenomenon.

The zenithal anchoring energy $W_Z$ depends strongly on the chemical properties of the surface and of the nematic material. On most solid surfaces, the zenithal anchoring energy is one or two orders of magnitude higher than the azimuthal anchoring energy.

If the orientation of the director in the volume is different from the direction of the easy axis, the surface energy is no longer zero and the result dependents also on a bulk elasticity factor. The surface energy can be characterized by its extrapolation length that is the ratio between the bulk elasticity factor and the anchoring energy. The extrapolation length of the zenithal anchoring is denoted by $L_Z = K_{33}/W_Z$, where $K_{33}$ is the bend elastic constant of the liquid crystal. In practice, a zenithal anchoring is considered as being strong if $L_Z < 15$ nm and weak if $L_Z > 25$ nm.

The orientation of liquid crystal molecules may be modified by external electrical or magnetic fields. For example, by applying an electric field that is perpendicular to the surface of the substrate, when liquid crystal molecules in the cell have positive dielectric anisotropy, they are oriented along the field ($\theta=0$), and in the absence of an electric field, they orient to be nearly parallel to the surface of the substrate ($\theta$=approximately 90°. On the surface, the director zenithal angle changes continuously as a function of the field, and $\theta$ becomes zero if the field exceeds the critical field $E_C$. This state is called zenithal anchoring break, since the director of the liquid crystal molecules close to the surface is no longer affected by an anchoring torque or an electric torque. The critical field is shown as the following equation formula (2):

$$E_C = \frac{W_Z}{\sqrt{K_{33}\Delta\varepsilon}} \qquad (2)$$

In the formula (2), $W_Z$ is the zenithal anchoring energy, $K_{33}$ is the bending elastic constant, and $\Delta \in$ the dielectric anisotropy (relative to the dielectric constant $\in_0$ of a vacuum).

This critical field strength $E_c$ is the field is necessary to drive devices that utilize zenithal anchoring breaking. Mixtures with a high value of $\Delta \in$ and high bending elasticity but a weak zenithal anchoring energy are necessary to control such devices.

In practice, the useful magnitude, in the case of zenithal anchoring breaking displays, is the voltage $U_z$ that causes zenithal anchoring breaking. That is, the product of the critical field and the thickness of the cell. Usually, the thickness of bistable nematic displays cells is adjusted so that their birefringence is equal to the half wavelength of light at the center of their passband. To characterise the zenithal anchoring, the breaking voltage threshold $U_{\lambda/2}$ is used. It is the breaking voltage $U_z$ of a cell of optical thickness $\lambda/2$. $U_{\lambda/2}$ is shown as the following equation formula (3).

$$U_{\lambda/2} = \frac{\lambda W_Z}{2\Delta n \sqrt{K_{33}\Delta \varepsilon}} = \frac{\lambda}{2\Delta n L_Z}\sqrt{\frac{K_{33}}{\Delta \varepsilon}} \quad (3)$$

In the formula (3), $\lambda$ is the wavelength of light at the center of the passband, $W_z$ is the zenithal anchoring energy, $L_z$ is the zenithal anchoring extrapolation length, $\Delta n$ is the refraction anisotropy in the wavelength $\lambda$, $K_{33}$ is the bending elastic constant, and $\Delta \in$ is the dielectric anisotropy. The inventors consider that zenithal anchoring is weak when the breaking voltage $U_{\lambda/2}$ is a voltage that can be supplied, within the temperature range, by a driver that is currently used ordinarily. In practice, this can be represented by the empirical rule stating that anchoring is weak if $U_{\lambda/2}$ is less than or equal to 25 volts.

The zenithal anchoring energy depends on the material of the alignment film, the method of the surface treatment, the liquid crystal composition used, and the temperature. The nature of the alignment film can greatly influence the zenithal anchoring energy. The polyimide orientation films used in classical LCDs show strong zenithal anchoring energy for most of the different families of nematic compounds. For example, on a commercially available polyimide orientation film (SE140 made by Nissan Chemicals Co.), $L_Z=7$ nm for the nematic compound pentyl-cyanobiphenyl (5CB), zenithal anchoring is strong. On the other hand, Nemoptic Ltd. has developed copolymer films that provides weak zenithal anchoring for 5CB ($L_Z>25$ nm at 20° C.) and for other nematic compounds (European Patent Application, Publication No. 1 259 854 and U.S. Pat. No. 7,067,180). In both patent documents, by standard method such as rubbing, a medium or strong azimuthal anchoring is simultaneously obtained leading to a good stability for both $T_0$ and $T_{180}$ textures.

Japanese Unexamined Patent Application, Publication No. 2005-133057 discloses an example of a liquid crystal composition in which the zenithal anchoring is weak. By combining nemoptic copolymer films with specific liquid crystal compositions, a low $U_{\lambda/2}$ is obtained, and combinations having a nematic phase over a wide temperature range are also disclosed. In fact optimized anchoring properties of bistable displays depend on both liquid crystal alignment layer and liquid crystal mixture, but some liquid crystal mixtures can lead to good anchoring properties compatible with different types of alignment layers.

However, in a bistable nematic display that uses zenithal anchoring breaking, the temperature range of the nematic phase and the operating temperature range of the display are not in a proportional relation. That is, at room temperature, even when the operating voltage is low, if the temperature dependency is high, the operating temperature range is in effect narrowed. In reality, a bistable nematic display that can operate over a wide temperature range has not been achieved. There is, therefore, a need to find a combination of liquid crystal compositions that can be activated over a wide operating temperature range.

DISCLOSURE OF THE INVENTION

The present invention was achieved in view of the aforementioned circumstances, and has as its object to provide a nematic liquid crystal composition that has a wide operating temperature range when used for a bistable nematic liquid crystal display and a bistable nematic liquid crystal display that uses the composition.

The present invention is based on the following findings as a result of studying various combinations of liquid crystal compounds to solve the aforementioned problem.

A nematic liquid crystal composition comprising:

a) at least 20% by weight of one or more compounds selected from the compound group A represented by general formulas AI to AVII:

[CHEMICAL 1]

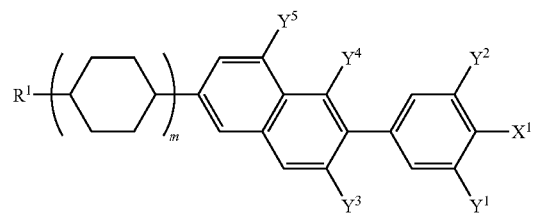

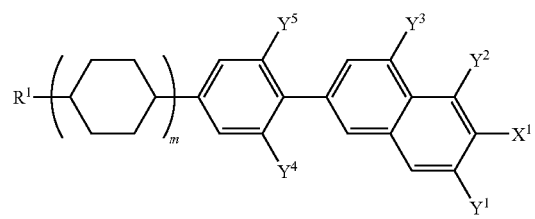

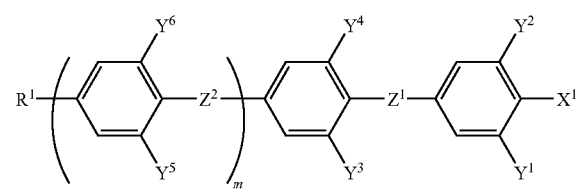

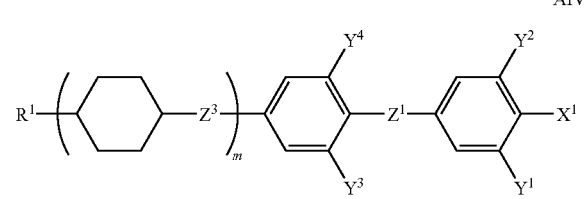

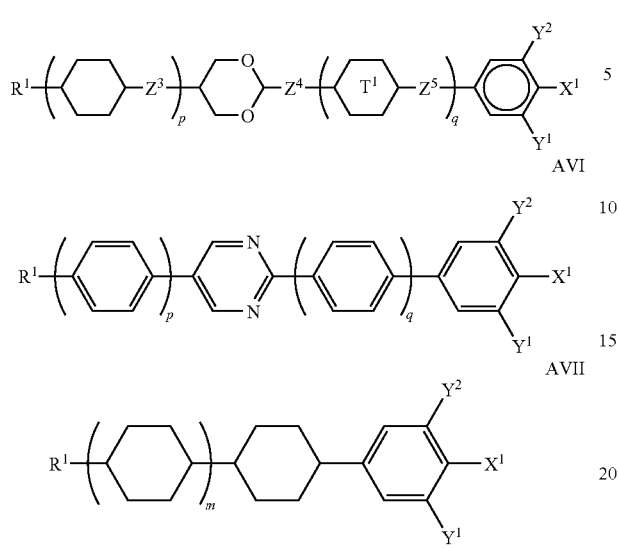

wherein:

R$^1$ is an alkyl group or alkenyl group having 2 to 7 carbon atoms, in which, in addition, one or more methylene groups existing in the alkyl group or alkenyl group may be substituted each independently with an —O—, —COO— or —OCO— where O atoms are not directly linked to each other, X$^1$ is a cyano group, a fluorine atom, a chlorine atom, a trifluoro methyl group, a trifluoro methoxy group, or a difluoromethoxy group (—OCHF$_2$), Z$^1$ and Z$^2$ are each, independently of one another, —COO—, —OCO—, —CH$_2$O—, —OCH$_2$—, —CF$_2$O—, —OCF$_2$—, —C≡C—, or a single bond, Z$^3$ and Z$^4$ are each, independently of one another, —CH$_2$CH$_2$—, —COO—, —OCO—, —CH$_2$O—, —OCH$_2$—, —CF$_2$O—, —OCF$_2$—, or a single bond, Z$^5$ is —CH$_2$CH$_2$—, —CH=CH—, —COO—, —OCO—, —CH$_2$O—, —OCH$_2$—, —CF$_2$O—, —OCF$_2$—, or a single bond, Y$^1$ to Y$^6$ are each, independently of one another, a hydrogen atom, a fluorine atom, a chlorine atom, a trifluoro methyl group, or a trifluoro methoxy group, ring T$^1$ is a 1,4-phenylene group or a 1,4-cyclohexylene group, in which among these groups the 1,4-phenylene group may be unsubstituted or may have one or more of a fluorine atom, a chlorine atom, a methyl group, a trifluoro methyl group, or a trifluoro methoxy group as a substituent group, m is 0 or 1, and p and q are 0 or 1, provided that p+q is 0 or 1 b) 5 to 50% by weight of one or more compounds selected from the compound group B represented by general formulas BI to BXI, and at least 3% by weight of the compounds in which R$^2$ and/or R$^3$ is/are an alkenyl group:

[CHEMICAL 2]

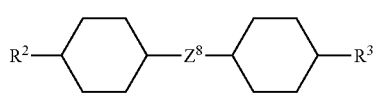

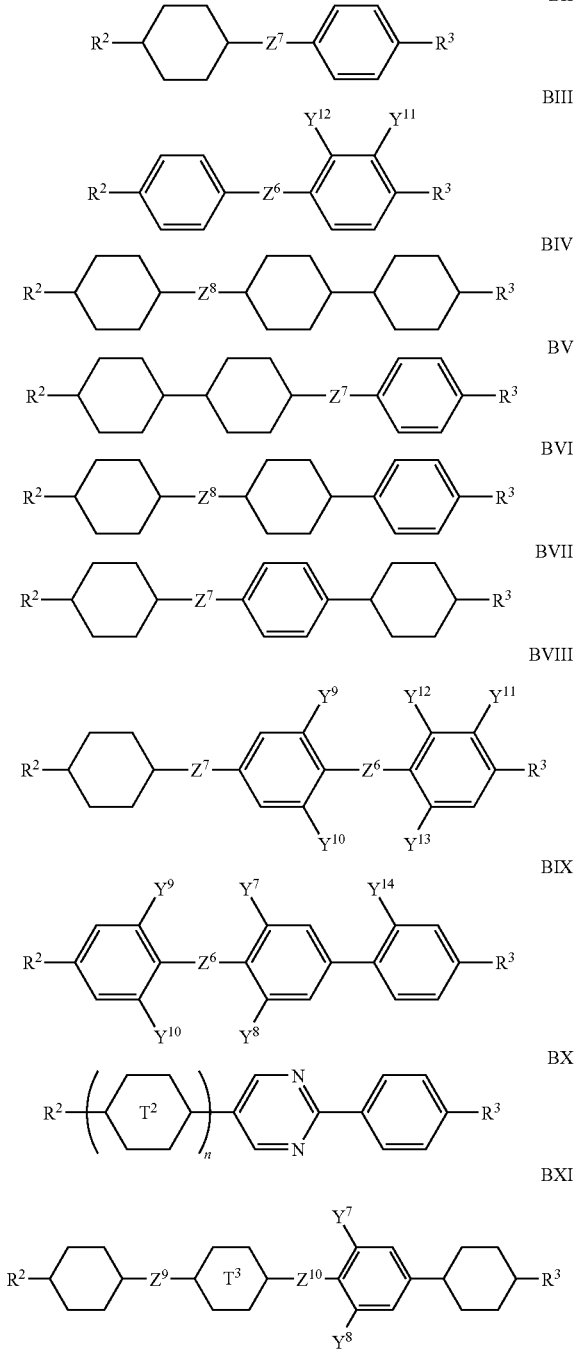

wherein:

R$^2$ and R$^3$ are each, independently of one another, an alkyl group having 1 to 7 carbon atoms or an alkenyl group having 2 to 7 carbon atoms, in which, in addition, one or more methylene groups existing in the alkyl group or alkenyl group may be substituted each independently with an —O—, —COO— or —OCO— where O atoms are not directly linked to each other, Z$^6$ is —COO—, —OCO—, —CH$_2$O—, —OCH$_2$—, —CF$_2$O—, —OCF$_2$—, —C≡C— or a single bond, Z$^7$ is —CH$_2$CH$_2$—, —COO—, —OCO—, —CH$_2$O—, —OCH$_2$—, —CF$_2$O—, —OCF$_2$—, or a single bond, $Z^8$ is —$CH_2CH_2$—, —CH=CH—, —COO—, —OCO—, —$CH_2O$—, —$OCH_2$—, —$CF_2O$—, —$OCF_2$—, or a single bond, $Z^9$ and $Z^{10}$ are each, independently of one another, —$CH_2CH_2$—, —COO—, —OCO—, or a single bond, $Y^7$ to $Y^{14}$ are each, independently of one another, a hydrogen atom, a methyl group, a fluorine atom, or a chlorine atom, rings $T^2$ and $T^3$ are each, independently of one another, a 1,4-phenylene group or a 1,4-cyclohexylene group, in which among these groups the 1,4-phenylene group may be unsubstituted or may have one or more of a fluorine atom, a chlorine atom, a methyl group, a trifluoro methyl group, or a trifluoro methoxy group as a substituent group, and n is 0 or 1;

characterized by the relative proportions of the above-mentioned compounds used in the nematic liquid crystal composition being determined to simultaneously obtain the following physical characteristics for the composition:

a nematic-isotropic liquid transition temperature ($T_{N-I}$) of the liquid crystal composition of greater than or equal to 60° C., a nematic temperature range ($\Delta T_N$) of the liquid crystal composition of greater than or equal to 70° C., a dielectric anisotropy of larger than or equal to $8\times10^{-11}$ F/m at 20° C., and a weak zenithal anchoring force on at least one of two substrates for a bistable nematic liquid crystal display that confine the composition, being defined by an anchoring breaking voltage $U_{\lambda/2}$ of less than or equal to 25 volts for a cell with a thickness (d) such that the product ($\Delta n \cdot d$) of the refractive index anisotropy ($\Delta n$) and the thickness (d) is 275 nm at 20° C.

The liquid crystal composition of the present invention can be used for a bistable nematic liquid crystal display in which it is confined between two substrates of which at least one of the substrates has a weak zenithal anchoring and can obtain a bistable nematic liquid crystal display that has a wide operating temperature range.

BRIEF DESCRIPTION OF THE REFERENCE SYMBOLS

Figure 1:
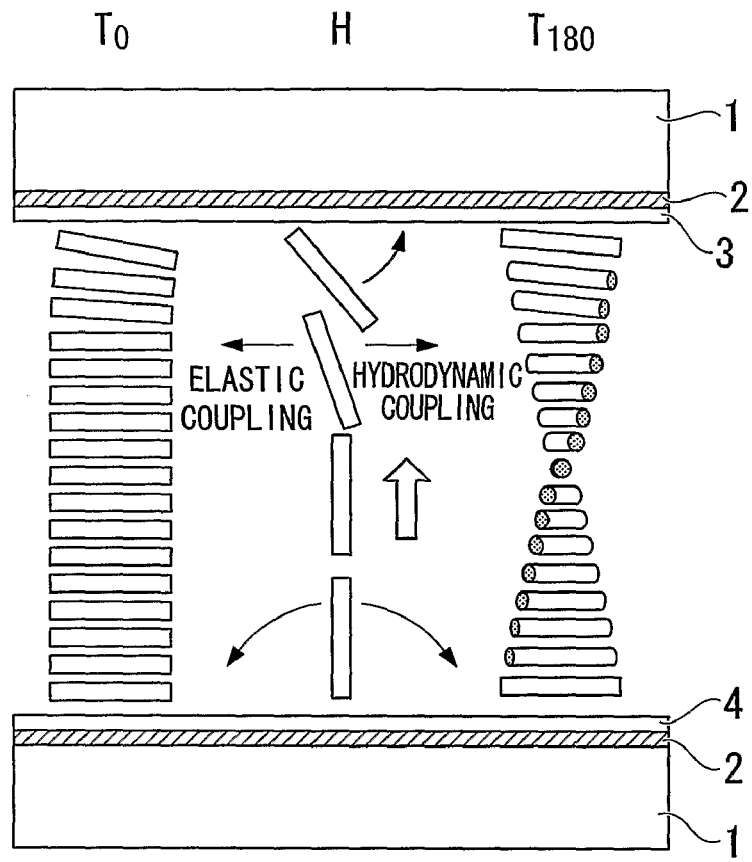
FIG. 1 is a drawing showing the operating of the bistable nematic liquid crystal display by anchoring breaking.
Figure 2:
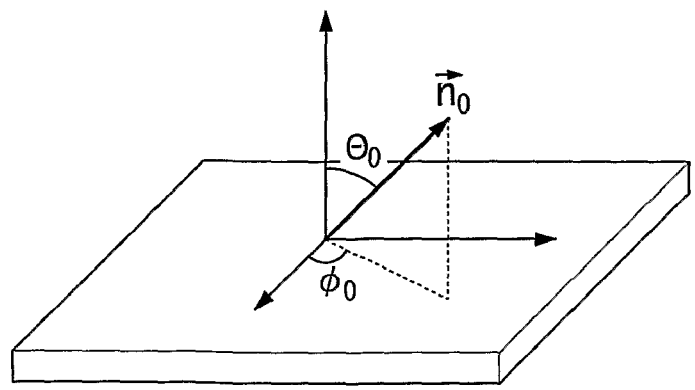
FIG. 2 is a drawing that explains the direction of the anchoring.

1: glass substrate, 2: ITO electrode layer, 3: alignment film with strong anchoring, 4: alignment film with weak anchoring

BEST MODE FOR CARRYING OUT THE INVENTION

One example of the present invention shall be described below.

In the liquid crystal composition of the present invention, compounds of general formulas AI to AVII that belong to the aforementioned compound group A are compounds that have a polar group on the terminal end, and are important compounds for causing anchoring breakage.

A particularly preferred case of the compound represented by general formulas AI to AVII is given below.

$X^1$ is preferably a cyano group or a fluorine atom.

$Z^1$ and $Z^2$ are preferably —COO—, —OCO—, or a single bond.

$Z^3$ and $Z^4$ are preferably —COO—, —OCO—, —$CH_2CH_2$—, or a single bond, and more preferably a single bond.

$Z^5$ is preferably —COO—, —OCO—, —$CH_2CH_2$—, or a single bond, and more preferably a single bond.

$Y^1$ to $Y^6$ are preferably a hydrogen atom or a fluorine atom.

Ring $T^1$ is preferably a 1,4-cyclohexylene group.

$R^1$ is preferably an alkyl group or alkenyl group having 2 to 6 carbon atoms, in which, in addition, one or more methylene groups existing in the alkyl group or alkenyl group may be substituted each independently with an —O—, —COO— or —OCO— where O atoms are not directly linked to each other, and more preferably an alkyl group or alkenyl group having 2 to 5 carbon atoms.

Also, preferable cases of the general formulas AI to AVII are given below.

In general formulas AI and AII, preferably $X^1$ is a fluorine atom, and $Y^1$ to $Y^5$, independently of one another, represent a hydrogen atom or a fluorine atom.

In general formula AIII, preferably m represents 0, and $Z^1$ represents —COO—, —OCO—, or a single bond, $X^1$ is a cyano group, and $Y^1$ to $Y^6$, independently of one another, represent a hydrogen atom or a fluorine atom.

In general formula AIV, preferably m represents 1, and $Z^1$ and $Z^3$, independently of one another, represent —COO—, —OCO—, or a single bond, $X^1$ is a cyano group, and $Y^1$ and $Y^2$, independently of one another, represent a hydrogen atom or a fluorine atom.

In general formula AV, preferably p and q represent 0 and 1, respectively, ring $T^1$ represents a 1,4-cyclohexylene group, $Z^4$ and $Z^5$, independently of one another, represent —$CH_2CH_2$—, or a single bond, $X^1$ is a fluorine atom or a cyano group, and $Y^1$ and $Y^2$, independently of one another, represent a hydrogen atom or a fluorine atom.

In general formula AVI, preferably $X^1$ is a fluorine atom or a cyano group, and $Y^1$ and $Y^2$, independently of one another, represent a hydrogen atom or a fluorine atom.

In general formula AVII, preferably m represents 1, and $X^1$ is a fluorine atom or a cyano group, and $Y^1$ and $Y^2$, independently of one another, represent a hydrogen atom or a fluorine atom.

More specifically, the following compounds are preferred.

[CHEMICAL 3]

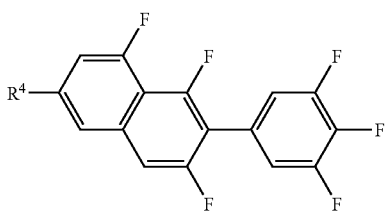

(I-1)

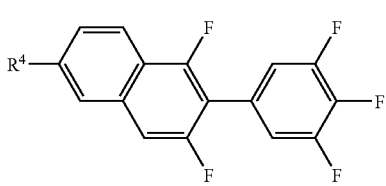

(I-2)

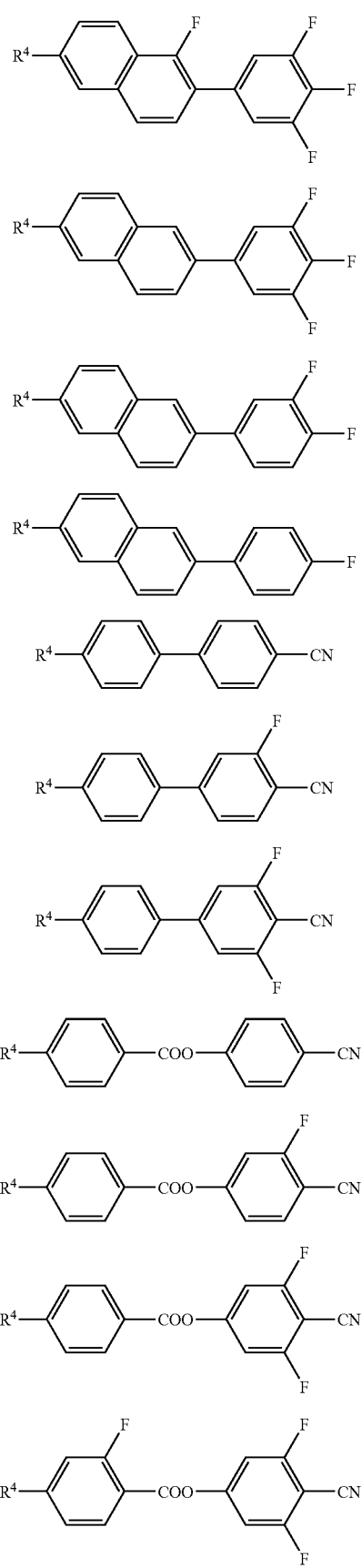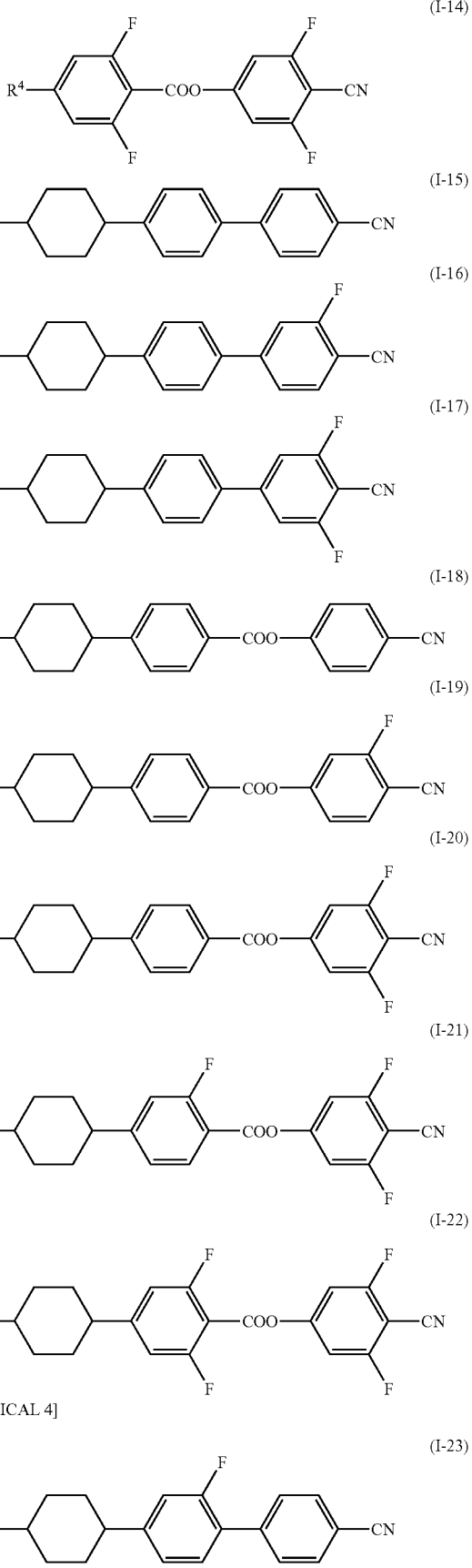

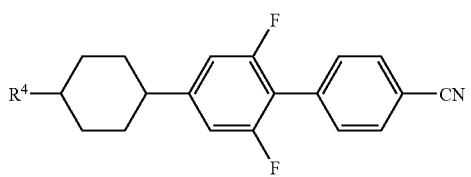
(I-24)
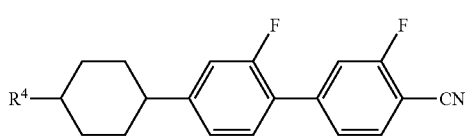
(I-25)
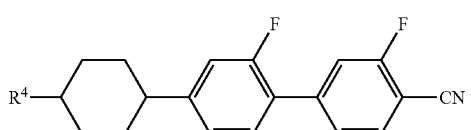
(I-26)
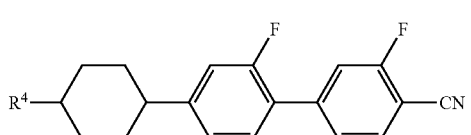
(I-27)
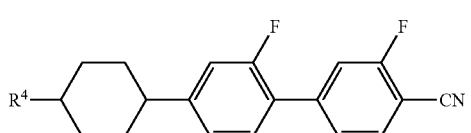
(I-28)
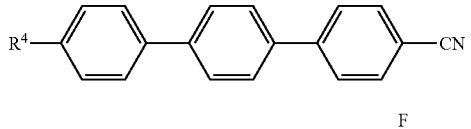
(I-29)
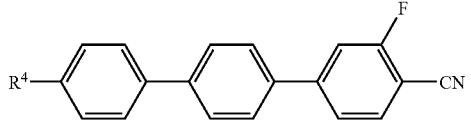
(I-30)
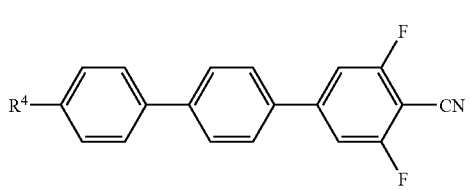
(I-31)
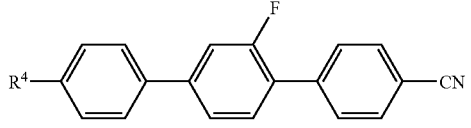
(I-32)
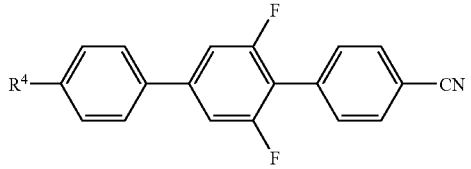
(I-33)
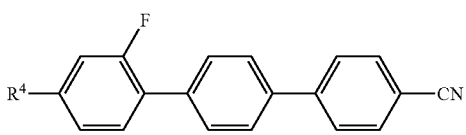
(I-34)
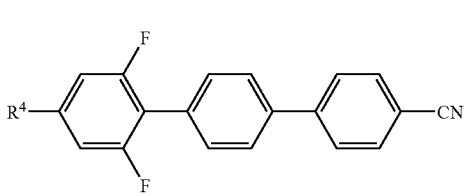
(I-35)
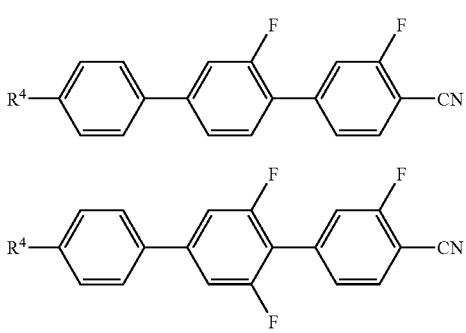
(I-36)
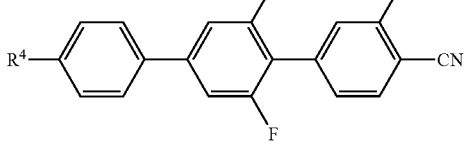
(I-37)
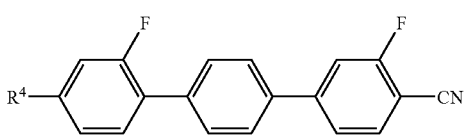
(I-38)
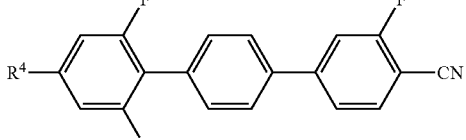
(I-39)
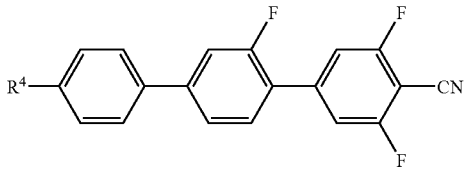
(I-40)
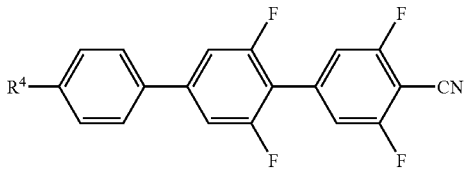
(I-41)
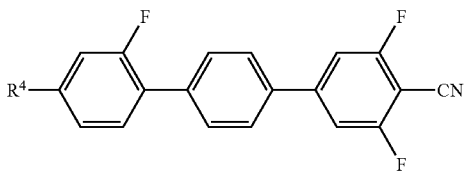
(I-42)

(I-43) 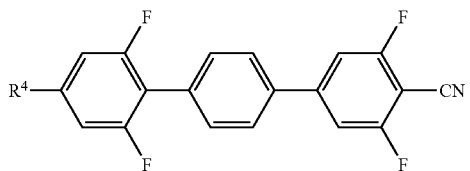
[CHEMICAL 5]
(I-44) 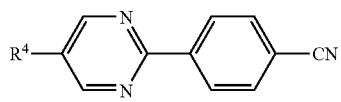
(I-45) 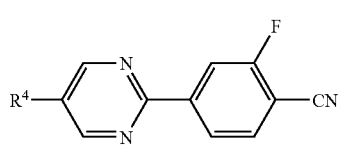
(I-46) 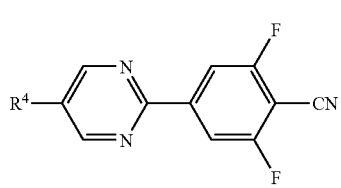
(I-47) 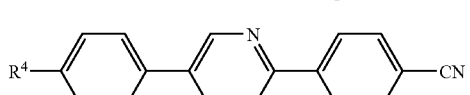
(I-48) 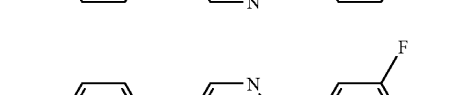
(I-49) 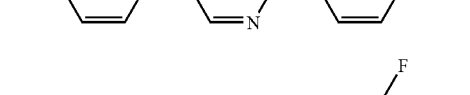
(I-50) 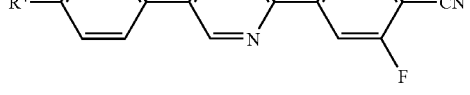
(I-51) 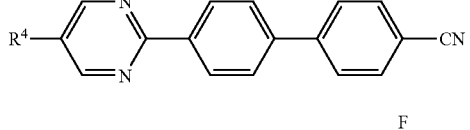
(I-52) 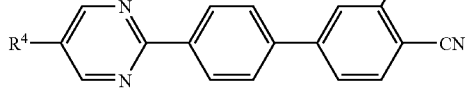
(I-53) 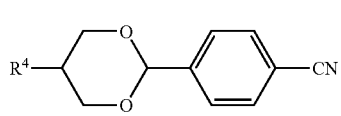
(I-54) 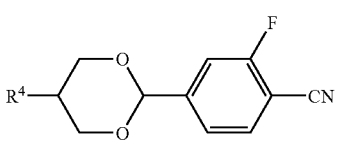
(I-55) 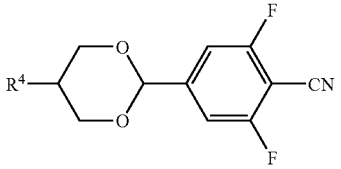
(I-56) 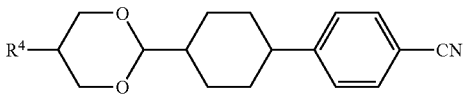
(I-57) 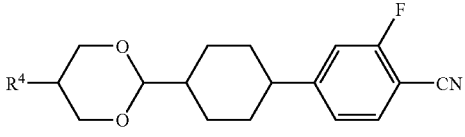
(I-58) 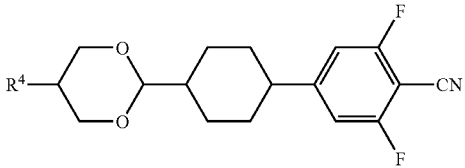
(I-59) 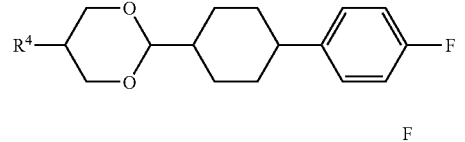
(I-60) 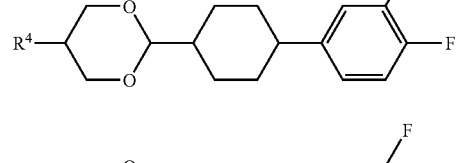
(I-61) 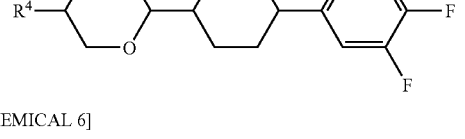
[CHEMICAL 6]
(I-62) 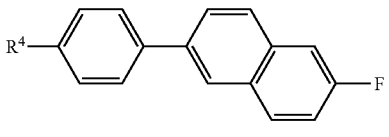
(I-63) 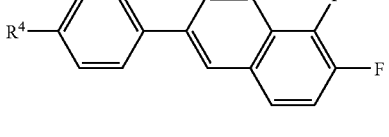

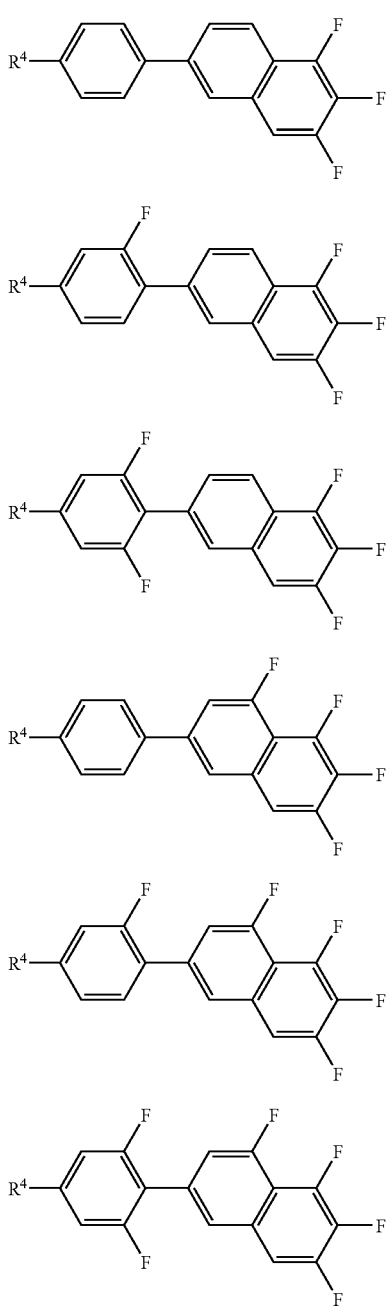

(I-64)
(I-65)
(I-66)
(I-67)
(I-68)
(I-69)

In formulas I-1 to I-69, $R^4$ is an alkyl group or alkenyl group having 2 to 6 carbon atoms, in which, in addition, one or more methylene groups existing in the alkyl group or alkenyl group may be substituted each independently with an —O— where O atoms are not directly linked to each other. Also, $R^4$ is preferably an alkyl group or alkenyl group having 2 to 6 carbon atoms. In addition, the alkyl group or alkenyl group is preferably a straight chain alkyl group or alkenyl group.

The liquid crystal composition of the present invention preferably contains at least 20% by weight of one or more compounds selected from the compound group A represented by general formulas AI to AVII.

Also, the liquid crystal composition more preferably contains at least 30% by weight of one or more compounds selected from the compound group A represented by general formulas AI to AVII and at least 20% by weight of the compound represented by the general formula AIII or AIV.

Also, the liquid crystal composition still more preferably contains at least 50% by weight of one or more compounds selected from the compound group A represented by general formulas AI to AVII and at least 30% by weight of the compound represented by the general formula AIII or AIV.

Also, the liquid crystal composition more preferably contains at least 20% by weight of two or more compounds selected from the compound group A represented by general formulas AI to AVII.

Among the compound group A represented by the general formulas AI to AVII, the content of compounds with a dielectric anisotropy larger than or equal to $3.5 \times 10^{-10}$ F/m is preferably not more than 25% by weight.

To improve reliability of liquid crystal mixtures, compounds of general formulas AVII may be added, in addition to the compounds of general formulas AI to AVI of the present invention. In these examples, in the case of mixing the compound group A or two or more compounds corresponding to general formulas thereof, the aforementioned values refer to the total content of the two or more compounds. Also, in the case of containing two or more of the compounds represented by the general formulas AI to AVII, $R^1$, $X^1$, $Y^1$ to $Y^6$, $Z^1$ to $Z^5$, $T^1$, m, p, and q of each of the compounds may be the same or different from each other.

In the liquid crystal composition of the present invention, compounds of the general formulas BI to BXI that belong to the aforementioned compound group B are compounds that do not have a polar group on the terminal end.

Among these compounds, the composition contains at least 3% by weight of compounds in which $R^2$ and/or $R^3$ is/are an alkenyl group. Thereby, the temperature dependency of the actuation voltage can be improved, and the operating temperature range can be widened.

A particularly preferred case of the compound represented by the general formulas BI to BXI is given below.

$R^2$ and $R^3$ are preferably an alkyl group having 1 to 6 carbon atoms or an alkenyl group having 2 to 6 carbon atoms, in which, in addition, one or more methylene groups existing in the alkyl group or alkenyl group may be substituted each independently with an —O—, —COO— or —OCO— where O atoms are not directly linked to each other, and more preferably an alkyl group having 1 to 6 carbon atoms or an alkenyl group having 2 to 6 carbon atoms.

$Z^6$ is preferably —COO—, —OCO—, —C≡C—, or a single bond, and more preferably —COO—, —OCO—, or a single bond.

$Z^7$, $Z^8$, $Z^9$, and $Z^{10}$ are preferably —COO—, —OCO—, —CH$_2$CH$_2$—, or a single bond.

Rings $T^2$ and $T^3$ are preferably a 1,4-cyclohexylene group.

$Y^7$ to $Y^{14}$ are preferably a hydrogen atom or a fluorine atom.

More specifically, the following compounds are preferred.

[CHEMICAL 7]

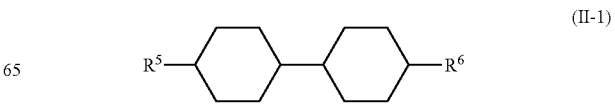

(II-1)

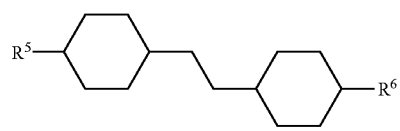
(II-2)
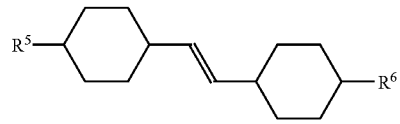
(II-3)
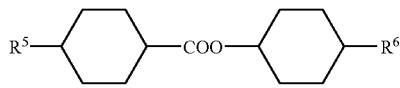
(II-4)
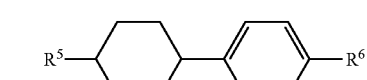
(II-5)
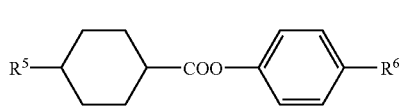
(II-6)
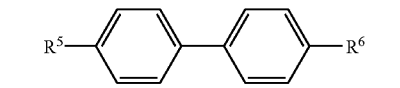
(II-7)
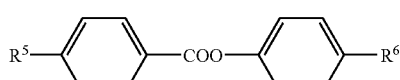
(II-8)
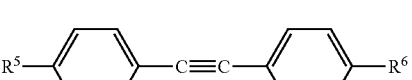
(II-9)
(II-10)
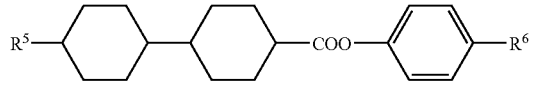
(II-11)
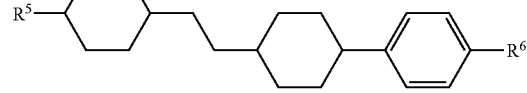
(II-12)
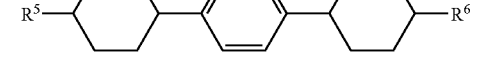
(II-13)
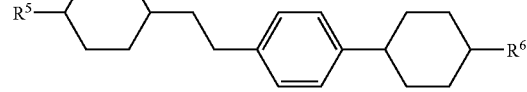
(II-14)
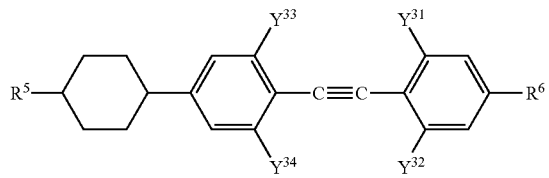
(II-15)
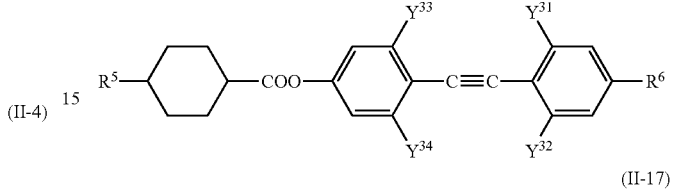
(II-16)
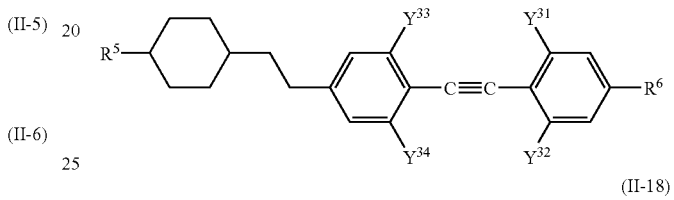
(II-17)
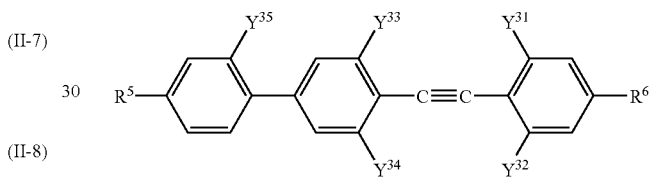
(II-18)
[CHEMICAL 8]

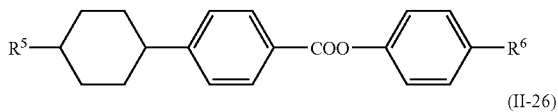

(II-25)

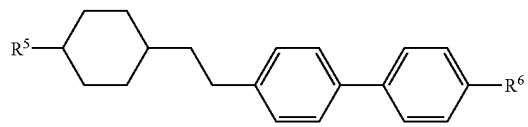

(II-26)

In formulas II-1 to II-26, $R^5$ and $R^6$ represent an alkyl group having 1 to 6 carbon atoms or an alkenyl group having 2 to 6 carbon atoms, in which, in addition, one or more methylene groups existing in the alkyl group or alkenyl group may be substituted each independently with an —O— where O atoms are not directly linked to each other, and $Y^{31}$ to $Y^{35}$ represent a hydrogen atom, a fluorine atom, or a methyl group.

The liquid crystal composition of the present invention must contain 5 to 50% by weight of one or more compounds selected from the compound group B represented by general formulas BI to BXI.

Also, the liquid crystal composition more preferably contains 5 to 40% by weight of one or more compounds selected from the compound group B represented by general formulas BI to BXI.

Also, the liquid crystal composition preferably contains at least 10% by weight of the compounds represented by general formulas BVI to BVIII.

In particular, in the compounds represented by (II-10) or (II-24), $R^5$ and/or $R^6$ more preferably are/is an alkenyl group having 2 to 7 carbon atoms, and the liquid crystal composition still more preferably contains at least 10% by weight of these compounds.

In these examples, in the case of mixing the compound group B or two or more compounds corresponding to general formulas thereof, the aforementioned values refer to the total content of the two or more compounds. Also, in the case of containing two or more of the compounds represented by general formulas BI to BXI, $R^2$, $R^3$, $Y^7$ to $Y^{14}$, $Z^6$ to $Z^{10}$, $T^2$, $T^3$, and n of each of the compounds may be the same or different from each other.

The nematic-isotropic liquid transition temperature ($T_{N-I}$) of the liquid crystal composition must be greater than or equal to 60° C. $T_{N-I}$ of the liquid crystal composition is more preferably greater than or equal to 70° C.

Also, in order for the liquid crystal display to attain a wide actuation temperature range, the temperature range ($\Delta T$) in which the liquid crystal composition exhibits a nematic phase must itself be wide. For this reason, the temperature range ($\Delta T$), which is defined by the difference between the upper limit temperature ($T_{N-I}$) (the nematic liquid crystal isotropic liquid transition temperature) and the lower limit temperature ($T_{X-N}$) (the transition temperature towards the nematic phase from more high-ordered liquid crystal phases or vitreous or crystalline solid phases), is preferably greater than or equal to 70° C., more preferably greater than or equal to 80° C., and still more preferably greater than or equal to 90° C.

Also, the lower limit temperature ($T_{X-N}$) at which the liquid crystal composition exhibits a nematic phase is preferably less than or equal to −10° C. and more preferably less than or equal to −20° C.

Since the greater the dielectric anisotropy ($\epsilon_0 \Delta\epsilon$) the lower the actuation voltage, the dielectric anisotropy of the liquid crystal composition at 20° C. must be greater than or equal to $8\times10^{-11}$ F/m. However, when it becomes excessively large, problems with reliability occur. For this reason, the value of the dielectric anisotropy at 20° C. is preferably $8\times10^{-11}$ to $6\times10^{-10}$ F/m, more preferably $1.3\times10^{-10}$ to $4.5\times10^{-10}$ F/m, and still more preferably $1.7\times10^{-10}$ to $3.5\times10^{-10}$ F/m. Moreover, $\epsilon_0\Delta\epsilon$ is more preferably $1.3\times10^{-10}$ to $3.0\times10^{-10}$ F/m ($\Delta\epsilon$ of 15 to 35). $\epsilon_0$ is the dielectric constant of vacuum.

The refractive index anisotropy ($\Delta n$) at 20° C. is preferably 0.13 to 0.19, more preferably 0.14 to 0.18, and still more preferably 0.15 to 0.18.

Also, the anchoring breaking voltage $U_{\lambda/2}$ (as represented by the equation formula (3)) must be less than or equal to 25 volts for a cell with thickness (d) such that the product ($\Delta n \cdot d$) of the refractive index anisotropy ($\Delta n$) and the thickness (d) is 275 nm (at a temperature of 20° C.) and the composition is confined between two substrates for a bistable nematic liquid crystal display in which at least one of the substrates has a weak zenithal anchoring force. The anchoring breaking voltage $U_{\lambda/2}$ is more preferably less than or equal to 20 V, and still more preferably less than or equal to 15 V when the product ($\Delta n \cdot d$) is 275 nm (at 20° C.).

In the liquid crystal composition of the present invention:

a) the liquid crystal composition is confined between two substrates of which at least one has a weak zenithal anchoring, the substrates have electrodes on their mutually facing inside surfaces so as to impress an electric field on the liquid crystal composition between the two substrates, and at least one substrate and electrode are optically transparent;

b) a process is applied to form at least two alternatively different textures that are stable or metastable under the absence of an electric field, with one of the textures being untwisted or twisted in a range −90° to +90°, while the other texture is twisted at an angle close to 180°;

c) the product ($\Delta n \cdot d$) at 20° C. (d being the thickness of the liquid crystal composition layer, $\Delta n$ the refractive index anisotropy of the liquid crystal composition) is $\lambda_0/2$ ($\lambda_0$ representing the center wavelength of the effective spectrum band of a display device), or an integral multiple of $\lambda_0$, or set to approach either one of these two types of values;

d) by breaking the anchoring with at least one of these two substrates, it is possible to switch between the aforementioned different textures, and after the electric field is removed, it can be retained by either texture, and so is useful for a bistable nematic liquid crystal display device (for example, the BiNem® display shown in FIG. 1).

In the liquid crystal display of the structure shown in FIG. 1, substrate 1 is a glass substrate having an electrode layer 2 that consists of a transparent conductive material such as indium tin oxide (ITO). The anchoring by alignment films 3, 4 of the two substrates 1, 1 is preferably monostable for both. Also, at least one alignment film has weak zenithal anchoring. Letting the extrapolation length of the zenithal anchoring be $L_Z$, zenithal anchoring is considered as being strong when $L_Z$ is less than 15 nm and weak if $L_Z$ greater than 25 nm.

Alignment film materials normally used as the alignment film 3 having strong zenithal anchoring include polyimide, polyamide, and SiO vapor-deposited film. A material consisting of a polyvinyl chloride (homopolymer) or a vinyl chloride copolymer (copolymer), as disclosed for example in European Patent Application, Publication No. 1 259 854, is suitable as the alignment film 4 that has weak zenithal anchoring. Monomers other than vinyl chloride used for a vinyl chloride copolymer include vinyl acetate, vinyl ether, acrylic ester, etc.

Since the present invention uses the aforedescribed liquid crystal composition as the liquid crystal composition confined between substrates of the liquid crystal display, it is possible to obtain a bistable nematic liquid crystal display with a wide operating temperature range.

The alignment film 4 with weak zenithal anchoring preferably has weak anchoring that is defined by an anchoring breaking voltage $U_{\lambda/2}$ being less than or equal to 25 volts for a cell with a thickness d such that the product ($\Delta n \cdot d$) of the refractive index anisotropy ($\Delta n$) and the thickness (d) is 275 nm (at a temperature of 20° C.). Thereby, the liquid crystal composition can adopt at least two different stable states with the weak zenithal anchoring, and can achieve switching between the two different stable states when a suitable electric signal is applied on the electrode layers 2. This switching is preferably of the anchoring breaking type.

Also, the two different stable states are preferably a first stable texture ($T_0$) that is uniform or slightly twisted in which the molecules of the liquid crystal composition are at least approximately parallel to each other, and a second stable texture ($T_{180}$) that differs from the first by a twist of 180° or an angle close to that (see FIG. 1). Thereby, when a suitable electric signal is applied to the two electrode layers 2, switching between ($T_0$) and ($T_{180}$) can be achieved. This switching is preferably achieved by breaking of the zenithal anchoring on at least one of the substrates.

In the bistable nematic liquid crystal display of the present invention, the product ($\Delta n \cdot d$) of the refractive index anisotropy ($\Delta n$) and the thickness (d) of the cell is preferably 200 to 300 nm at 20° C., and more preferably 220 to 280 inn Since the refractive index anisotropy ($\Delta n$) at 20° C. is determined by the liquid crystal composition, it is possible to attain the desired product ($\Delta n \cdot d$)) by adjusting the gap between the substrates with a spacer.

EXAMPLES

The present invention shall be explained in greater detail below with examples, but the present invention is not limited by these examples. Also, "%" in the compositions of the examples and comparative examples below means "% by weight". Also, unless otherwise specified, the nematic phase temperature range means the temperature range (temperature difference) from the solid phase or smectic phase-nematic phase transition temperature to the nematic phase-isotropic liquid phase transition temperature.

$T_{N-I}$: nematic phase-isotropic liquid phase transition temperature $T_{X-N}$: solid phase or smectic phase-nematic phase transition temperature $\Delta \in$: dielectric anisotropy at 20° C.

$\Delta n$: refractive index anisotropy at 20° C.

Example 1

Two glass substrates with ITO were prepared as substrates to confine the liquid crystal composition, with $SiO_2$ (thickness: 107 nm) being vapor deposited on one of the glass substrates with ITO in order to obtain strong zenithal anchoring of a high tilt, while a polymer (vinyl chloride isobutyl-vinyl-ether copolymer) represented by the following formula (G) was coated with the method described below to a thickness of 20 nm on the other substrate in order to obtain a weak zenithal anchoring force:

[CHEMICAL 9]

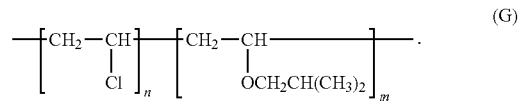

Step 1: A solution of the polymer diluted to 0.75% by weight in a 50/50 mixture of N-methylpyrolidone and butoxy ethanol is applied by spin coating.
Step 2: Annealing is carried out at 150° C. for 1.5 hours.
Step 3: Ultraviolet irradiation ($\lambda$=254 nm) is carried out for 2 hours using a 100 W mercury-vapor lamp.
Step 4: Annealing is performed at 150° C. for 30 min.
Step 5: A brushing process (rubbing) with a roller covered with a cloth velvet is carried out to induce azimuthal anchoring.

The two substrates are bonded together with a 1.5 μm spacer to form a BiNem®-type cell, and after adding chiral dopant S-811 (Merck Ltd.) to achieve a spontaneous pitch of 6 μm at 25° C. in the liquid crystal composition (H) shown below, it is injected into the cell.

[CHEMICAL 10]

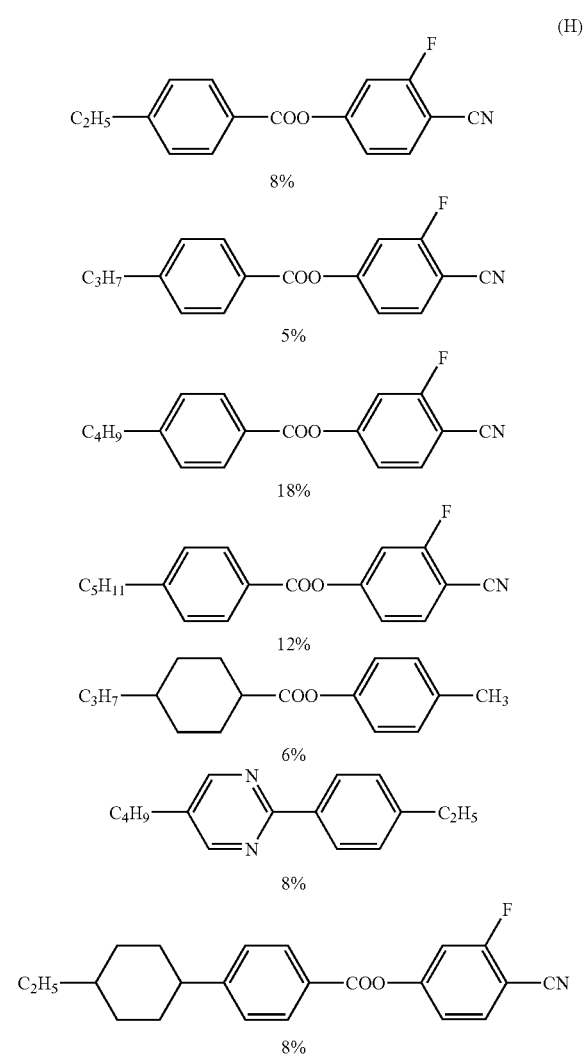

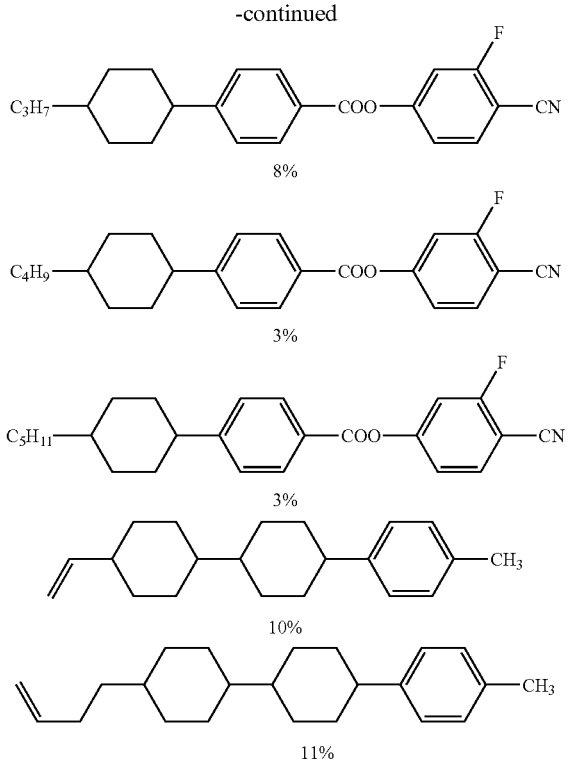

A plurality of measurement temperatures are set in order to measure the operating temperature, and at each temperature a voltage with a pulse width of 5 ms is applied to the cell at 1 V steps until a maximum 30 V. By measuring the anchoring breaking voltage, the actuation voltage is set and the operating temperature range is evaluated.

The liquid crystal composition (H) is a liquid crystal composition that contains 21% by weight of compounds having alkenyl groups selected from the compound group B. The property values of this liquid crystal composition are $(T_{N-I})$= 79.3° C., $(T_{X-N})$=−16° C., and nematic liquid crystal temperature range $(\Delta T_N)$=95.3° C. Also, the dielectric anisotropy $(\epsilon_0 \Delta \epsilon)$=3.66×10$^{-10}$ F/m, and the refractive index anisotropy $(\Delta n)$=0.1506. Accordingly, the product $(\Delta n \cdot d)$ of this cell is 225.9 nm.

The operating temperature range of the liquid crystal composition (H) in this BiNem®-type cell is −1 to 71° C., and the operating temperature width is 72° C. The threshold voltage $U_Z$ was 13.3 V at 20° C. This threshold voltage $U_Z$, converted to $U_{\lambda/2}$ when the product $(\Delta n \cdot d)$ is 275 nm, is 16.2 V. $U_{\lambda/2}$ when the product $(\Delta n \cdot d)$ is 275 nm is converted by the following equation formula (4).

$$U_{\lambda/2} = U_Z \times \frac{275 \text{ nm}}{\Delta n \cdot d} \quad (4)$$

Example 2

The liquid crystal composition (I) shown below was substituted for the liquid crystal composition (H) in Example 1 and subjected to a similar evaluation.

[CHEMICAL 11]

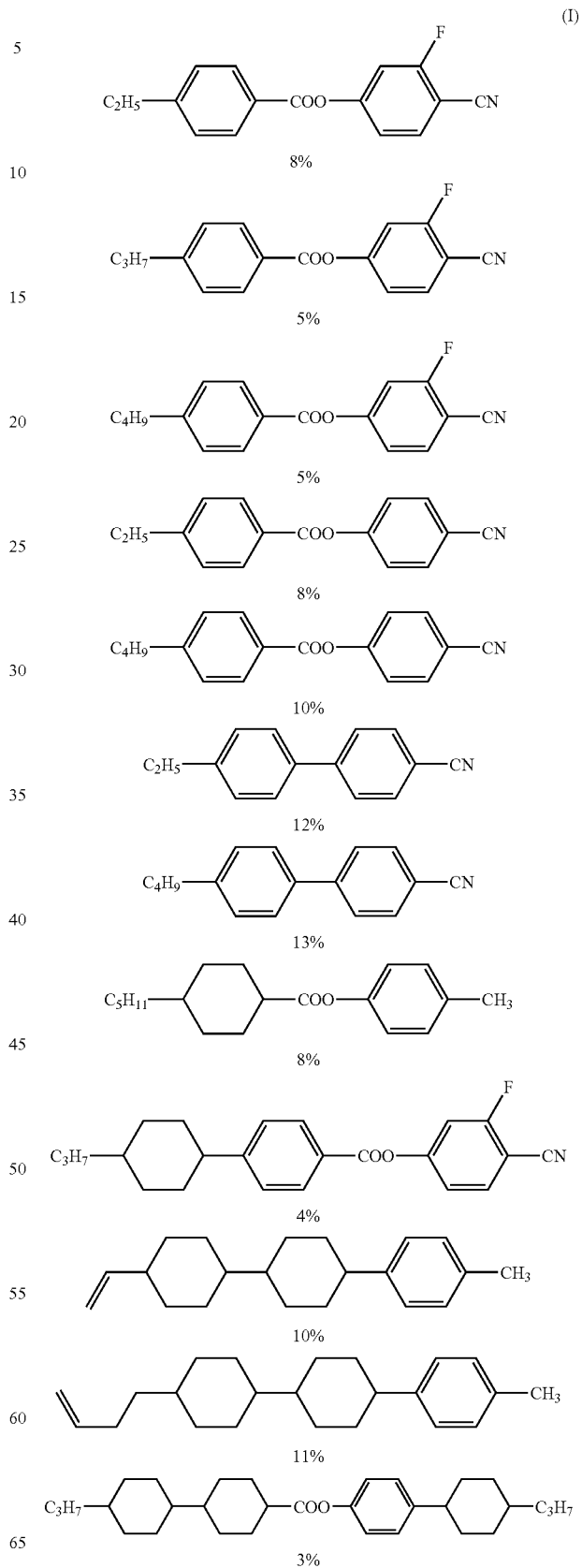

(I)

-continued

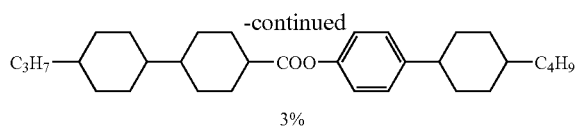

3%

The liquid crystal composition (I) is a liquid crystal composition that contains 21% by weight of compounds having alkenyl groups selected from the compound group B. The property values of this liquid crystal composition are $(T_{N-I})=$ 73.9° C., $(T_{X-N})$ −40° C., and nematic liquid crystal temperature range $(\Delta T_N)=113.9°$ C. Also, the dielectric anisotropy $(\epsilon_0 \Delta\epsilon)=2.01\times10^{-10}$ F/m, and the refractive index anisotropy $(\Delta n)=0.1586$. Accordingly, the product $(\Delta n \cdot d)$ of this cell is 237.9 nm.

The operating temperature range of the liquid crystal composition (I) in this BiNem®-type cell is 0 to 60° C., with the operating temperature width being 60° C. The threshold voltage $U_Z$ was 16.8 V at 20° C. This threshold voltage $U_Z$, converted to $U_{\lambda/2}$ when the product $(\Delta n \cdot d)$ is 275 nm, is 19.4 V.

Example 3

The liquid crystal composition (J) shown below was substituted for the liquid crystal composition (H) in Example 1 and subjected to a similar evaluation.

[CHEMICAL 12]

(J)

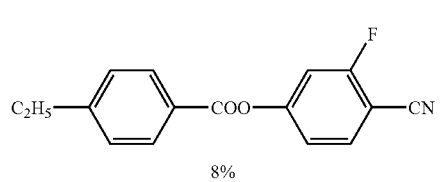

8%

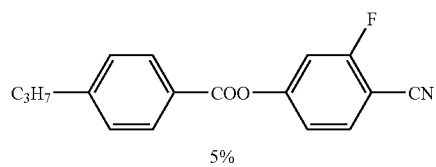

5%

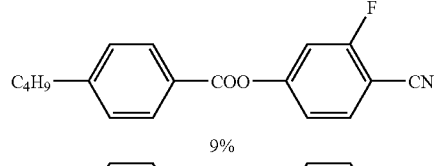

9%

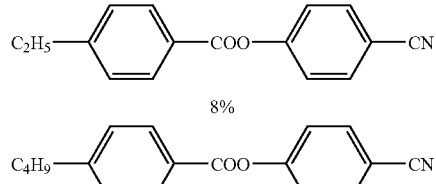

8%

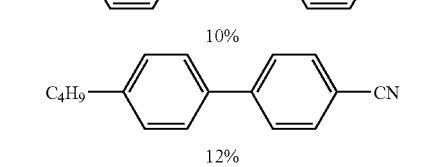

10%

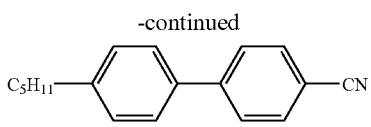

12%

-continued

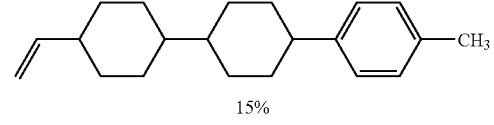

13%

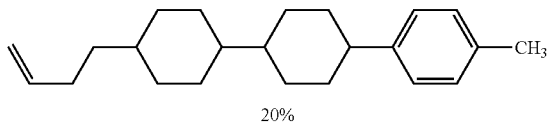

15%

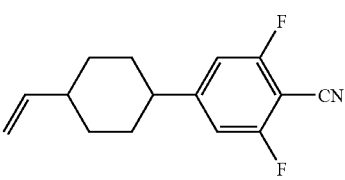

20%

The liquid crystal composition (J) is a liquid crystal composition that contains 35% by weight of compounds having alkenyl groups selected from the compound group B. The property values of this liquid crystal composition are $(T_{N-I})=$ 71.3° C., $(T_{X-N})=-19°$ C., and nematic liquid crystal temperature range $(\Delta T_N)=90.3°$ C. Also, the dielectric anisotropy $(\epsilon_0 \Delta\epsilon)=2.02\times10^{-10}$ F/m, and the refractive index anisotropy $(\Delta n)=0.1588$. Accordingly, the product $(\Delta n \cdot d)$ of this cell is 238.2 nm.

The operating temperature range of the liquid crystal composition (J) in this BiNem®-type cell is −0 to 60° C., with the operating temperature width being 60° C. The threshold voltage $U_Z$ was 15.3 V at 20° C. This threshold voltage $U_Z$, converted to $U_{\lambda/2}$ when the product $(\Delta n \cdot d)$ is 275 nm, is 17.7 V.

Example 4

The liquid crystal composition (R) shown below was substituted for the liquid crystal composition (H) in Example 1 and subjected to a similar evaluation.

[CHEMICAL 13]

(R)

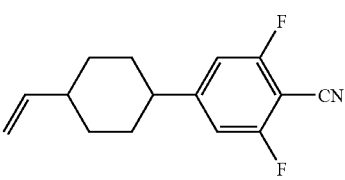

5%

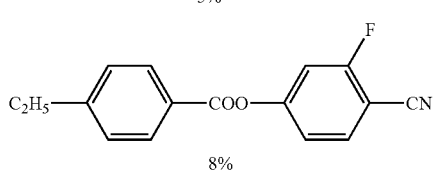

8%

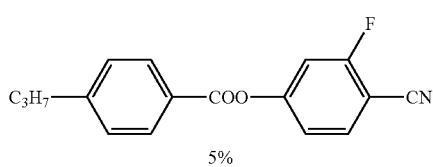

5%

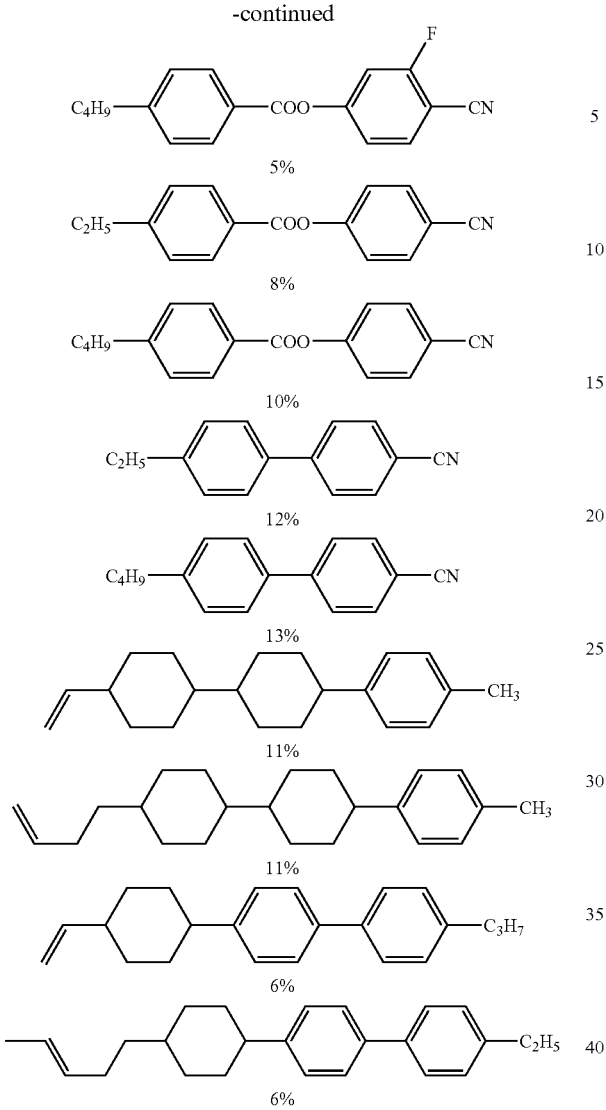

The liquid crystal composition (R) is a liquid crystal composition that contains 34% by weight of compounds having alkenyl groups selected from the compound group B. The property values of this liquid crystal composition are $(T_{N\text{-}I})$= 63.3° C., $(T_{X\text{-}N})$=−37° C., and nematic liquid crystal temperature range $(\Delta T_N)$=100.3° C. Also, the dielectric anisotropy $(\epsilon_0 \Delta\epsilon)$=1.94×10$^{-10}$ F/m, and the refractive index anisotropy $(\Delta n)$=0.1615. Accordingly, the product $(\Delta n \cdot d)$ of this cell is 242.25 nm.

The operating temperature range of the liquid crystal composition (R) in this BiNem®-type cell is −5 to 60° C., with the operating temperature width being 65° C. The threshold voltage $U_Z$ was 14.5 V at 20° C. This threshold voltage $U_Z$, converted to $U_{\lambda/2}$ when the product $(\Delta n \cdot d)$ is 275 nm, is 16.5 V.

Example 5

The liquid crystal composition (S) shown below was substituted for the liquid crystal composition (H) in Example 1 and subjected to a similar evaluation.

[CHEMICAL 14]

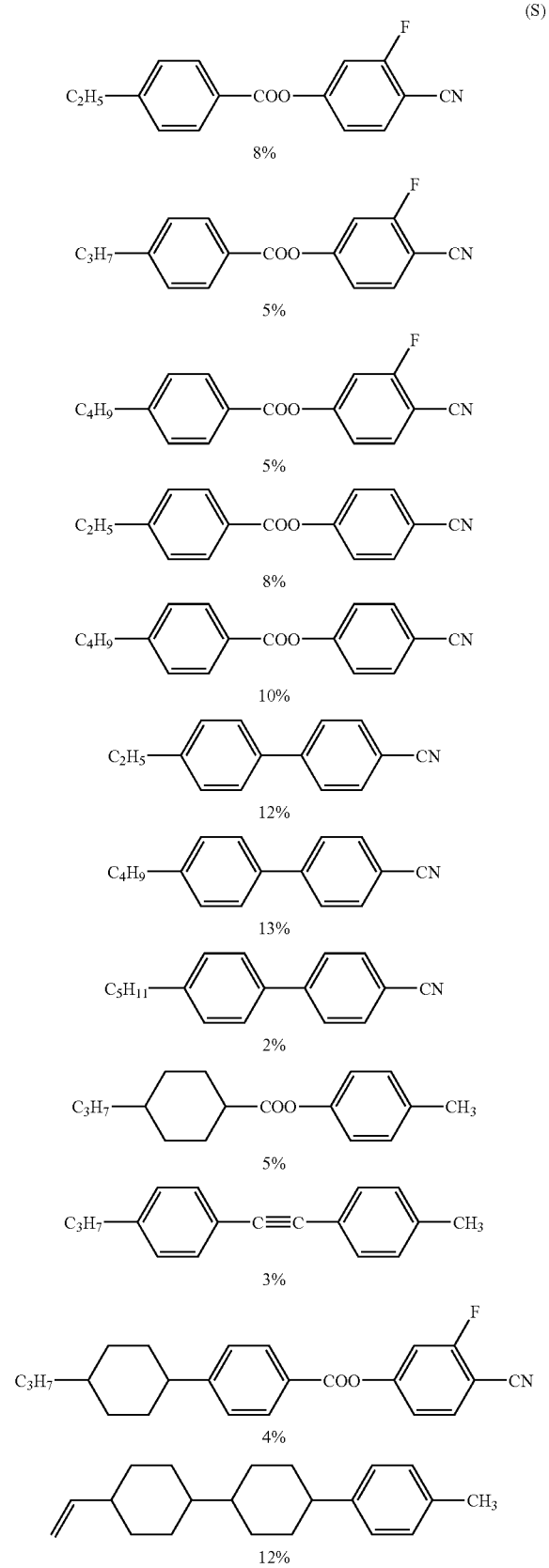

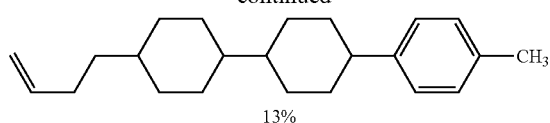

13%

The liquid crystal composition (S) is a liquid crystal composition that contains 25% by weight of compounds having alkenyl groups selected from the compound group B. The property values of this liquid crystal composition are $(T_{N-I})$= 61.4° C., $(T_{X-N})$=−39° C., and nematic liquid crystal temperature range $(\Delta T_N)$=100.4° C. Also, the dielectric anisotropy $(\epsilon_0 \Delta\epsilon)$=1.94×10$^{-10}$ F/m, and the refractive index anisotropy $(\Delta n)$=0.1605. Accordingly, the product $(\Delta n \cdot d)$ of this cell is 240.75 nm.

The operating temperature range of the liquid crystal composition (S) in this BiNem®-type cell is −8 to 57° C., with the operating temperature width being 65° C. The threshold voltage $U_Z$ was 10.8 V at 20° C. This threshold voltage $U_Z$, converted to $U_{\lambda/2}$ when the product $(\Delta n \cdot d)$ is 275 nm, is 12.3 V.

Example 6

The liquid crystal composition (T) shown below was substituted for the liquid crystal composition (H) in Example 1 and subjected to a similar evaluation.

[CHEMICAL 15]

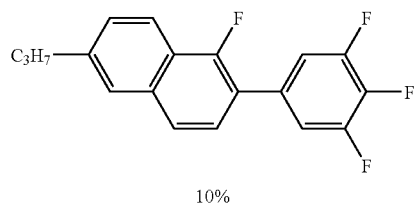

(T)

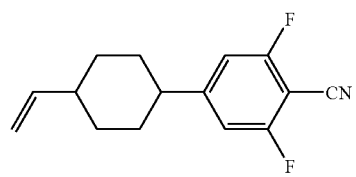

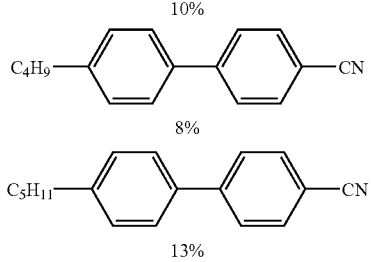

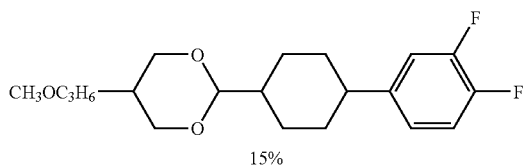

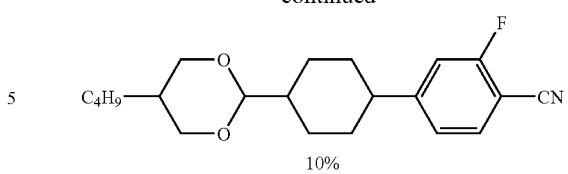

The liquid crystal composition (T) is a liquid crystal composition that contains 12% by weight of compounds having alkenyl groups selected from the compound group B. The property values of this liquid crystal composition are $(T_{N-I})$= 71.8° C., $(T_{X-N})$=−35° C., and nematic liquid crystal temperature range $(\Delta T_N)$=106.8° C. Also, the dielectric anisotropy $(\epsilon_0 \Delta\epsilon)$=1.97×10$^{-10}$ F/m, and the refractive index anisotropy $(\Delta n)$=0.148. Accordingly, the product $(\Delta n \cdot d)$ of this cell is 222 nm.

The operating temperature range of the liquid crystal composition (T) in this BiNem®-type cell is −5 to 65° C., with the operating temperature width being 70° C. The threshold voltage $U_Z$ was 16.1 V at 20° C. This threshold voltage $U_Z$, converted to $U_{\lambda/2}$ when the product $(\Delta n \cdot d)$ is 275 nm, is 19.9 V.

Example 7

The liquid crystal composition (U) shown below was substituted for the liquid crystal composition (H) in Example 1 and subjected to a similar evaluation.

[CHEMICAL 16]

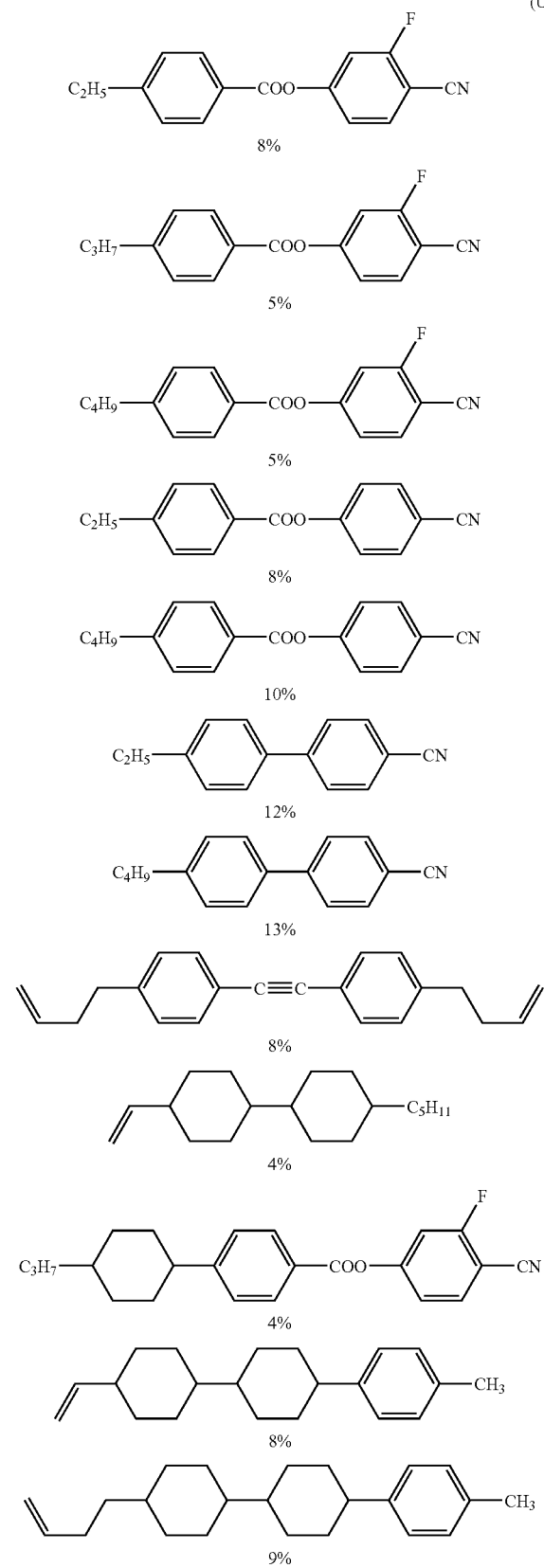

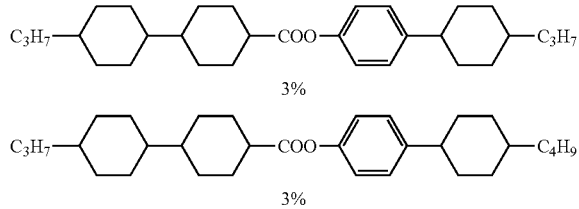

The liquid crystal composition (U) is a liquid crystal composition that contains 29% by weight of compounds having alkenyl groups selected from the compound group B. The property values of this liquid crystal composition are $(T_{N\text{-}I})$=68.0° C., $(T_{X\text{-}N})$=−36° C., and nematic liquid crystal temperature range $(\Delta T_N)$=104.0° C. Also, the dielectric anisotropy $(\epsilon_0\Delta\epsilon)$=1.90×10$^{-10}$ F/m, and the refractive index anisotropy $(\Delta n)$=0.169. Accordingly, the product $(\Delta n\cdot d)$ of this cell is 253.5 nm.

The operating temperature range of the liquid crystal composition (U) in this BiNem®-type cell is −6 to 62° C., with the operating temperature width being 68° C. The threshold voltage $U_Z$ was 14.8 V at 20° C. This threshold voltage $U_Z$, converted to $U_{\lambda/2}$ when the product $(\Delta n\cdot d)$ is 275 nm, is 16.1 V.

Example 8

The liquid crystal composition (V) shown below was substituted for the liquid crystal composition (H) in Example 1 and subjected to a similar evaluation.

[CHEMICAL 17]

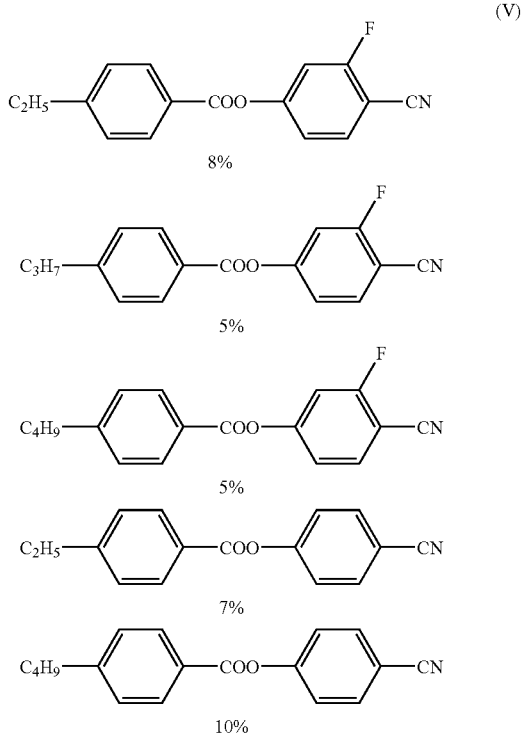

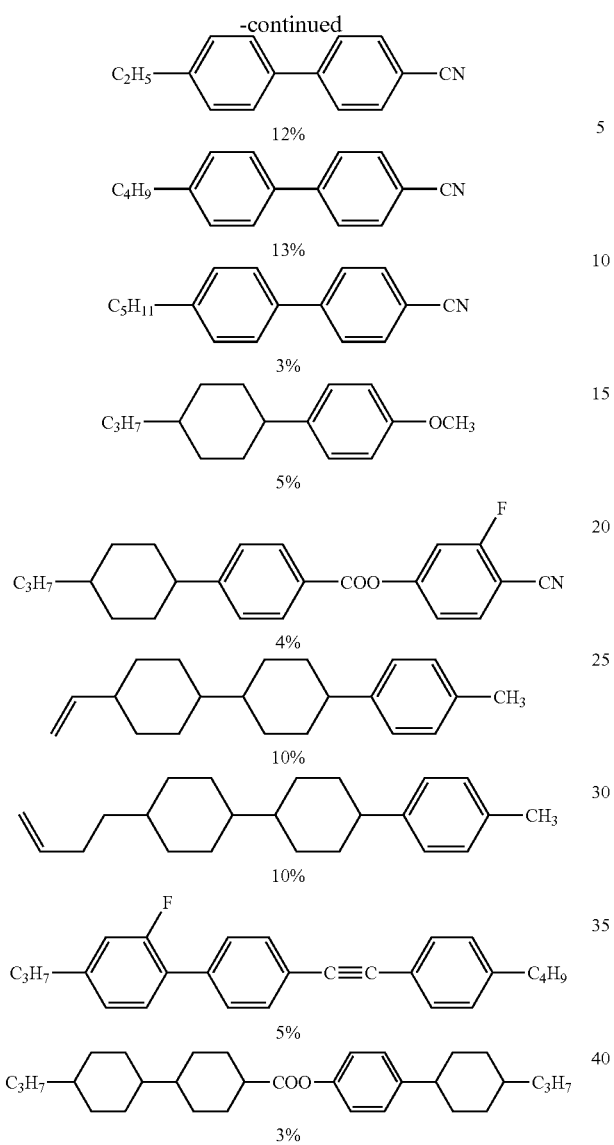

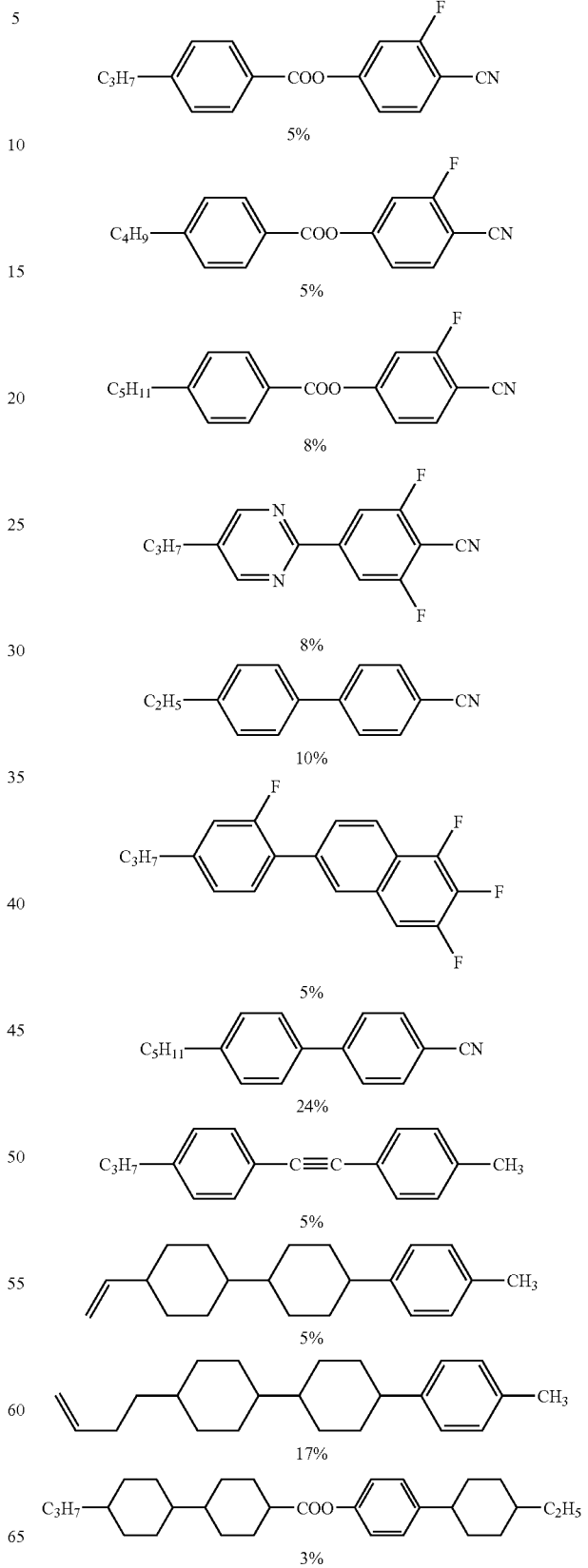

The liquid crystal composition (V) is a liquid crystal composition that contains 20% by weight of compounds having alkenyl groups selected from the compound group B. The property values of this liquid crystal composition are $(T_{N-I})$=67.1° C., $(T_{X-N})$=−33° C., and nematic liquid crystal temperature range $(\Delta T_N)$=100.1° C. Also, the dielectric anisotropy $(\varepsilon_0 \Delta \varepsilon)$=2.05×10$^{-10}$ F/m, and the refractive index anisotropy $(\Delta n)$=0.168. Accordingly, the product $(\Delta n \cdot d)$ of this cell is 252 nm.

The operating temperature range of the liquid crystal composition (V) in this BiNem®-type cell is −6 to 61° C., with the operating temperature width being 67° C. The threshold voltage $U_Z$ was 14.6 V at 20° C. This threshold voltage $U_Z$, converted to $U_{\lambda/2}$ when the product $(\Delta n \cdot d)$ is 275 nm, is 15.9 V.

Example 9

The liquid crystal composition (W) shown below was substituted for the liquid crystal composition (H) in Example 1 and subjected to a similar evaluation.

[CHEMICAL 18]

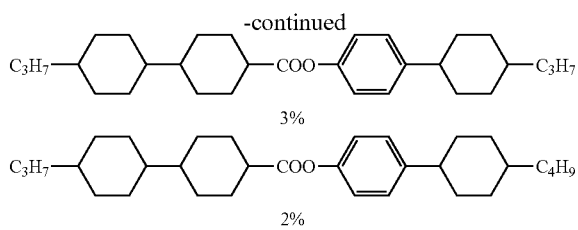

3%

2%

The liquid crystal composition (W) is a liquid crystal composition that contains 22% by weight of compounds having alkenyl groups selected from the compound group B. The property values of this liquid crystal composition are $(T_{N-I})=64.8°$ C., $(T_{X-N})=-33°$ C., and nematic liquid crystal temperature range $(\Delta T_N)=97.8°$ C. Also, the dielectric anisotropy $(\epsilon_0\Delta\epsilon)=1.8\times10^{-10}$ F/m, and the refractive index anisotropy $(\Delta n)=0.170$. Accordingly, the product $(\Delta n\cdot d)$ of this cell is 255 nm.

The operating temperature range of the liquid crystal composition (V) in this BiNem®-type cell is −5 to 60° C., with the operating temperature width being 65° C. The threshold voltage $U_Z$ was 15.5 V at 20° C. This threshold voltage $U_Z$, converted to $U_{\lambda/2}$ when the product $(\Delta n\cdot d)$ is 275 nm, is 16.7 V.

Example 10

The liquid crystal composition (M) shown below was substituted for the liquid crystal composition (H) in Example 1 and subjected to a similar evaluation.

[CHEMICAL 19]

(M)

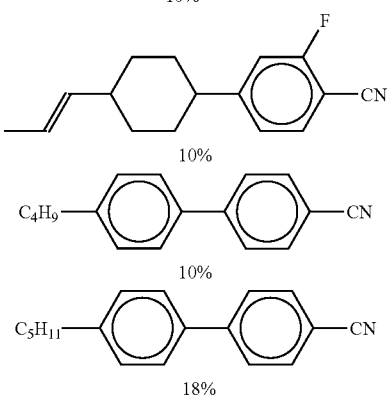

10%

10%

10%

18%

15%

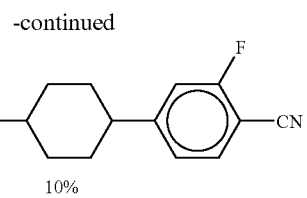

10%

5%

10%

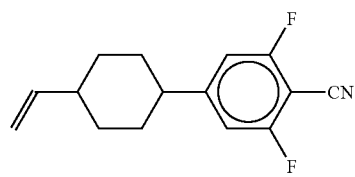

6%

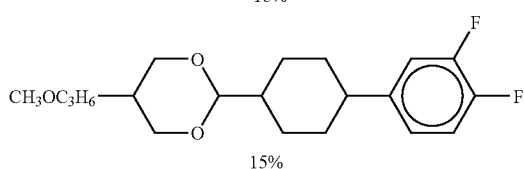

3%

3%

The liquid crystal composition (M) is a liquid crystal composition that contains 6% by weight of compounds having alkenyl groups selected from the compound group B. The property values of this liquid crystal composition are $(T_{N-I})=62.4°$ C., $(T_{X-N})=-34°$ C., and nematic liquid crystal temperature range $(\Delta T_N)=96.4°$ C. Also, the dielectric anisotropy $(\epsilon_0\Delta\epsilon)=2.03\times10^{-10}$ F/m, and the refractive index anisotropy $(\Delta n)=0.137$. Accordingly, the product $(\Delta n\cdot d)$ of this cell is 206 nm.

The operating temperature range of the liquid crystal composition (M) in this BiNem®-type cell is −5 to 60° C., with the operating temperature width being 65° C. The threshold voltage $U_Z$ was 12.0 V at 20° C. This threshold voltage $U_Z$, converted to $U_{\lambda/2}$ when the product $(\Delta n\cdot d)$ is 275 nm, is 16.0 V.

Example 11

The liquid crystal composition (N) shown below was substituted for the liquid crystal composition (H) in Example 1 and subjected to a similar evaluation.

[CHEMICAL 20]

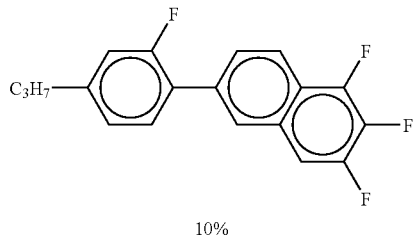

10%

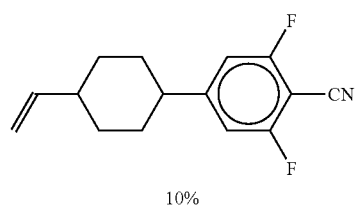

10%

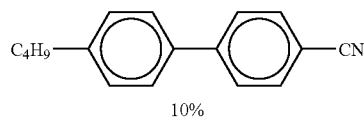

10%

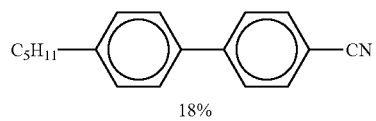

18%

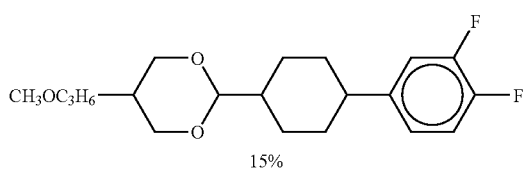

15%

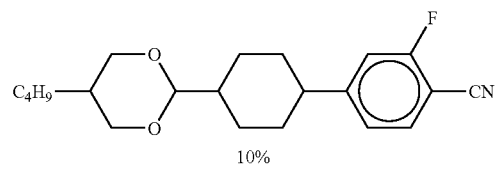

10%

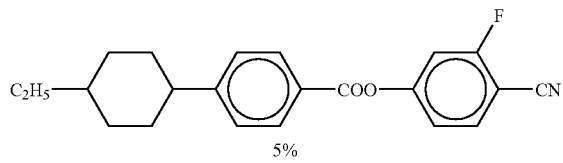

5%

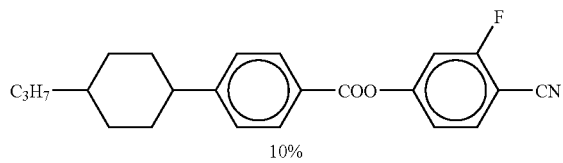

10%

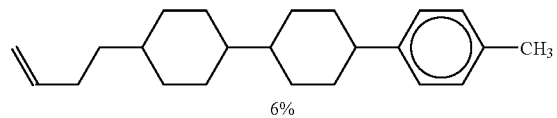

6%

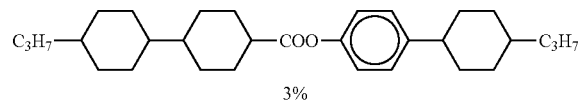

3%

(N)

-continued $C_3H_7$—⬡—⬡—COO—◯—⬡—$C_4H_9$

3%

The liquid crystal composition (N) is a liquid crystal composition that contains 6% by weight of compounds having alkenyl groups selected from the compound group B. The property values of this liquid crystal composition are $(T_{N-I})$=66.0° C., $(T_{X-N})$=−35° C., and nematic liquid crystal temperature range $(\Delta T_N)$=101.0° C. Also, the dielectric anisotropy $(\epsilon_0\Delta\epsilon)$=2.14×10$^{-10}$ F/m, and the refractive index anisotropy $(\Delta n)$=0.143. Accordingly, the product $(\Delta n \cdot d)$ of this cell is 215 nm.

The operating temperature range of the liquid crystal composition (N) in this BiNem®-type cell is −5 to 60° C., with the operating temperature width being 65° C. The threshold voltage $U_Z$ was 14.0 V at 20° C. This threshold voltage $U_Z$, converted to $U_{\lambda/2}$ when the product $(\Delta n \cdot d)$ is 275 nm, is 17.9 V.

Comparative Example 1

The liquid crystal composition (P) shown below was substituted for the liquid crystal composition (H) in Example 1 and subjected to a similar evaluation.

[CHEMICAL 21]

(P)

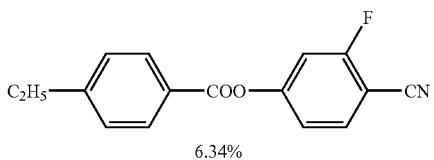

6.34%

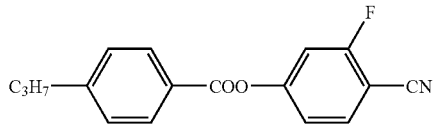

10.79%

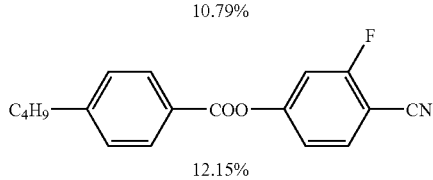

12.15%

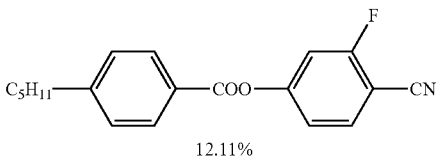

12.11%

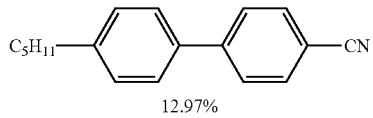

12.97%

$C_7H_{15}$—◯—◯—CN 12.97%

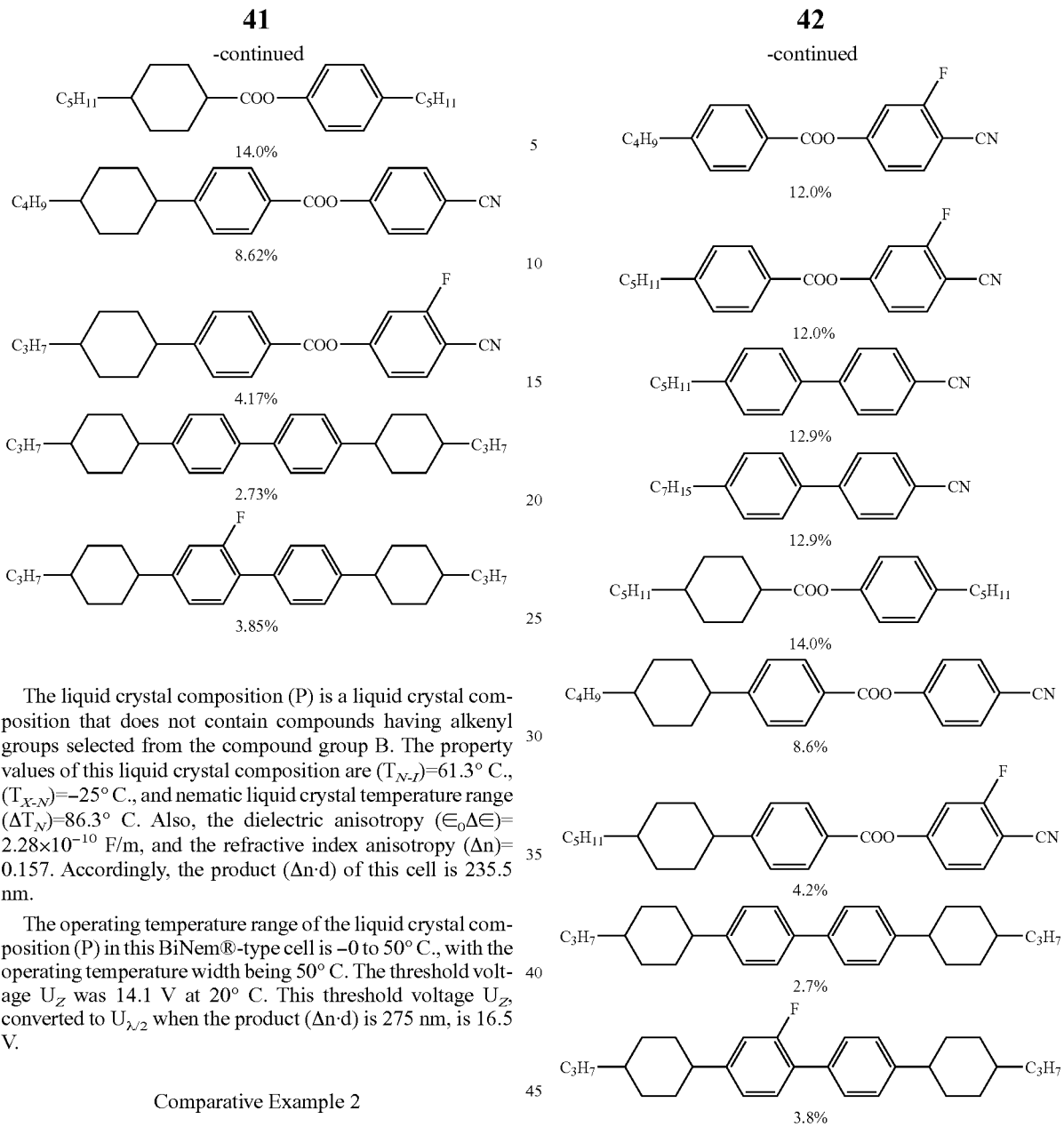

The liquid crystal composition (P) is a liquid crystal composition that does not contain compounds having alkenyl groups selected from the compound group B. The property values of this liquid crystal composition are $(T_{N-I})=61.3°$ C., $(T_{X-N})=-25°$ C., and nematic liquid crystal temperature range $(\Delta T_N)=86.3°$ C. Also, the dielectric anisotropy $(\epsilon_0\Delta\epsilon)=2.28\times10^{-10}$ F/m, and the refractive index anisotropy $(\Delta n)=0.157$. Accordingly, the product $(\Delta n \cdot d)$ of this cell is 235.5 nm.

The operating temperature range of the liquid crystal composition (P) in this BiNem®-type cell is −0 to 50° C., with the operating temperature width being 50° C. The threshold voltage $U_Z$ was 14.1 V at 20° C. This threshold voltage $U_Z$, converted to $U_{\lambda/2}$ when the product $(\Delta n \cdot d)$ is 275 nm, is 16.5 V.

Comparative Example 2

The liquid crystal composition (Q) shown below was substituted for the liquid crystal composition (H) in Example 1 and subjected to a similar evaluation.

[CHEMICAL 22]

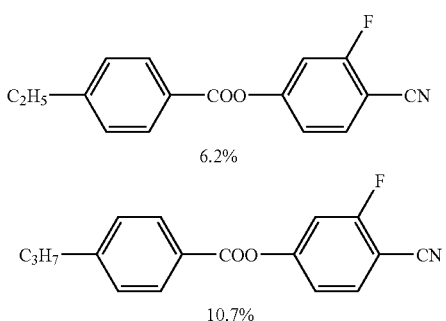

The liquid crystal composition (Q) is a liquid crystal composition that does not contain compounds having alkenyl groups selected from the compound group B. The property values of this liquid crystal composition are $(T_{N-I})=61.0°$ C., $(T_{X-N})=-20°$ C., and nematic liquid crystal temperature range $(\Delta T_N)=81.0°$ C. Also, the dielectric anisotropy $(\epsilon_0\Delta\epsilon)=2.57\times10^{-10}$ F/m, and the refractive index anisotropy $(\Delta n)=0.156$. Accordingly, the product $(\Delta n \cdot d)$ of this cell is 234 nm.

The operating temperature range of the liquid crystal composition (Q) in this BiNem®-type cell is 5 to 50° C., with the operating temperature width being 45° C. The threshold voltage $U_Z$ was 14.2 V at 20° C. This threshold voltage $U_Z$, converted to $U_{\lambda/2}$ when the product $(\Delta n \cdot d)$ is 275 nm, is 16.7 V.

Table 1 shows the results of evaluating the property values of the liquid crystal compositions prepared in the Examples and Comparative Examples described above, and the results of evaluating the properties of the liquid crystal displays fabricated using these liquid crystal compositions.

TABLE 1

|  | Example 1 | Example 2 | Example 3 | Example 4 | Example 5 | Example 6 | Example 7 |
|---|---|---|---|---|---|---|---|
| $T_{N-I}$ (°C.) | 79.3 | 73.9 | 71.3 | 63.3 | 61.4 | 71.8 | 68.0 |
| $T_{X-N}$ (°C.) | −16 | −40 | −19 | −37 | −39 | −35 | −36 |
| $\Delta T_N$ (°C.) | 95.3 | 113.9 | 90.3 | 100.3 | 100.4 | 106.8 | 104.0 |
| $\Delta n$ | 0.1506 | 0.1586 | 0.1588 | 0.1615 | 0.1605 | 0.148 | 0.169 |
| d (μm) | 1.5 | 1.5 | 1.5 | 1.5 | 1.5 | 1.5 | 1.5 |
| $\Delta n \cdot d$ (nm) | 225.9 | 237.9 | 238.2 | 242.25 | 240.75 | 222 | 253.5 |
| $\Delta \epsilon$ | 41.34 | 22.72 | 22.76 | 21.92 | 21.87 | 22.3 | 21.5 |
| $\epsilon_0 \Delta \epsilon$ (F/m) | $3.66 \times 10^{-10}$ | $2.01 \times 10^{-10}$ | $2.02 \times 10^{-10}$ | $1.94 \times 10^{-10}$ | $1.94 \times 10^{-10}$ | $1.97 \times 10^{-10}$ | $1.90 \times 10^{-10}$ |
| operating temperature range (°C.) | −1~71 | 0~60 | 0~60 | −5~60 | −8~57 | −5~65 | −6~62 |
| operating temperature width (°C.) | 72 | 60 | 60 | 65 | 65 | 70 | 68 |
| $U_Z$ (V) | 13.3 | 16.8 | 15.3 | 14.5 | 10.8 | 16.1 | 14.8 |
| $U_{\lambda/2}$ (V) at 275 nm | 16.2 | 19.4 | 17.7 | 16.5 | 12.3 | 19.9 | 16.1 |

|  | Example 8 | Example 9 | Example 10 | Example 11 | Comparative Example 1 | Comparative Example 2 |
|---|---|---|---|---|---|---|
| $T_{N-I}$ (°C.) | 67.1 | 64.8 | 62.4 | 66.0 | 61.3 | 61.0 |
| $T_{X-N}$ (°C.) | −33 | −33 | −34 | −35 | −25 | −20 |
| $\Delta T_N$ (°C.) | 100.1 | 97.8 | 96.4 | 101 | 86.3 | 81.0 |
| $\Delta n$ | 0.168 | 0.170 | 0.137 | 0.143 | 0.157 | 0.156 |
| d (μm) | 1.5 | 1.5 | 1.5 | 1.5 | 1.5 | 1.5 |
| $\Delta n \cdot d$ (nm) | 252 | 255 | 206 | 215 | 235.5 | 234 |
| $\Delta \epsilon$ | 23.2 | 20.3 | 22.9 | 24.2 | 25.8 | 29 |
| $\epsilon_0 \Delta \epsilon$ (F/m) | $2.05 \times 10^{-10}$ | $1.8 \times 10^{-10}$ | $2.03 \times 10^{-10}$ | $2.14 \times 10^{-10}$ | $2.28 \times 10^{-10}$ | $2.57 \times 10^{-10}$ |
| operating temperature range (°C.) | −6~61 | −5~60 | −5~60 | −5~60 | 0~50 | 5~50 |
| operating temperature width (°C.) | 67 | 65 | 65 | 65 | 50 | 45 |
| $U_Z$ (V) | 14.6 | 15.5 | 12.0 | 14.0 | 14.1 | 14.2 |
| $U_{\lambda/2}$ (V) at 275 nm | 15.9 | 16.7 | 16.0 | 17.9 | 16.5 | 16.7 |

Comparing the Examples and Comparative Examples, it can be seen that the operating temperature range of the BiNem®-type cell is wider for the Examples. That is, with the combination of liquid crystal materials in the present invention, it is possible to obtain a liquid crystal composition having a wide operating temperature range in a bistable nematic liquid crystal display.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

INDUSTRIAL APPLICABILITY

The liquid crystal composition of the present invention can be suitably utilized for a bistable nematic liquid crystal display in which the composition is confined between two substrates of which at least one of the substrates has a weak zenithal anchoring, and can obtain a bistable nematic liquid crystal display having a wide operating temperature range.

The invention claimed is:

1. A nematic liquid crystal compound comprising:

a) at least 20% by weight of one or more compounds selected from the compound group A represented by general formulas AI to AVII:

[CHEMICAL 1]

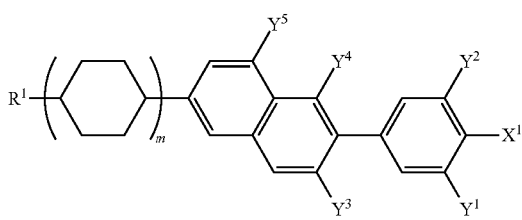

AI

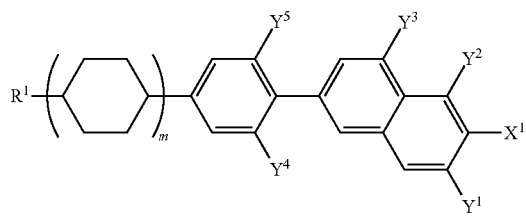

AII

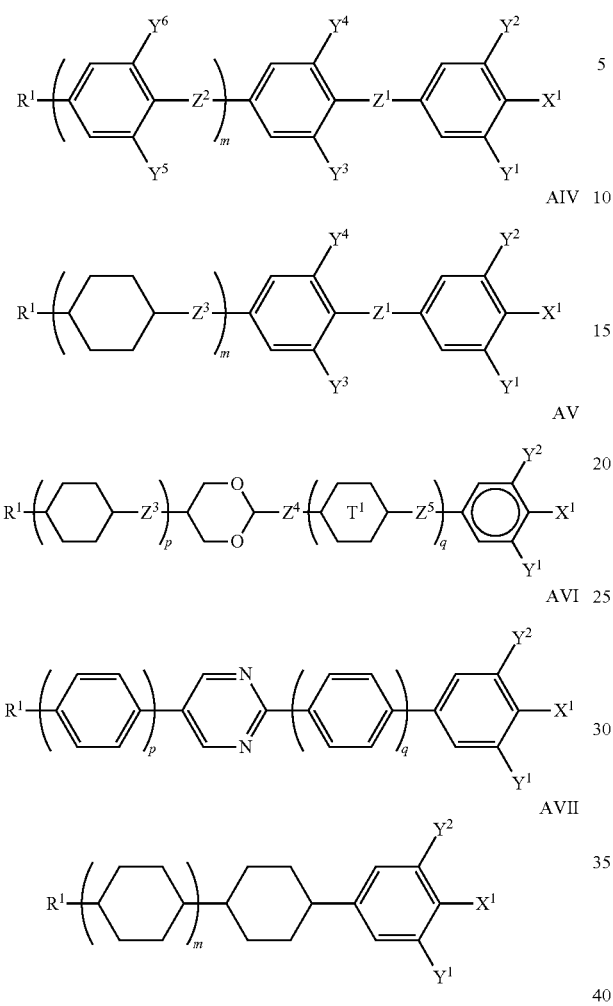

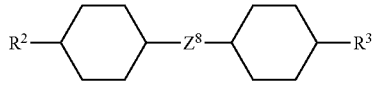

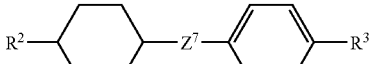

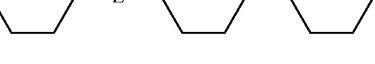

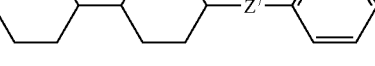

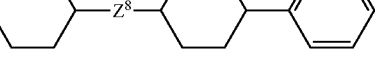

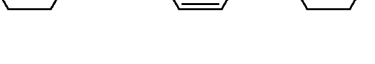

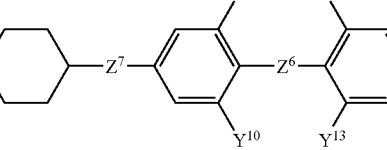

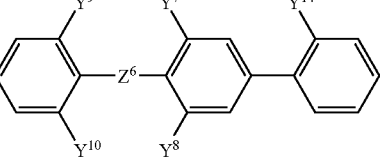

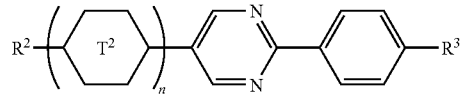

wherein:
- $R^1$ is an alkyl group or alkenyl group having 2 to 7 carbon atoms, in which, in addition, one or more methylene groups existing in the alkyl group or alkenyl group may be substituted each independently with an —O—, —COO— or —OCO— where O atoms are not directly linked to each other,
- $X^1$ is a cyano group, a fluorine atom, a chlorine atom, a trifluoro methyl group, a trifluoro methoxy group, or a difluoromethoxy group (—OCHF$_2$),
- $Z^1$ and $Z^2$ are each, independently of one another, —COO—, —OCO—, —CH$_2$O—, —OCH$_2$—, —CF$_2$O—, —OCF$_2$—, —C≡C—, or a single bond,
- $Z^3$ and $Z^4$ are each, independently of one another, —CH$_2$CH$_2$—, —COO—, —OCO—, —CH$_2$O—, —OCH$_2$—, —CF$_2$O—, —OCF$_2$—, or a single bond,
- $Z^5$ is —CH$_2$CH$_2$—, —CH=CH—, —COO—, —OCO—, —CH$_2$O—, —OCH$_2$—, —CF$_2$O—, —OCF$_2$—, or a single bond,
- $Y^1$ to $Y^6$ are each, independently of one another, a hydrogen atom, a fluorine atom, a chlorine atom, a trifluoro methyl group, or a trifluoro methoxy group,
- ring $T^1$ is a 1,4-phenylene group or a 1,4-cyclohexylene group, in which among these groups the 1,4-phenylene group may be unsubstituted or may have one or more of a fluorine atom, a chlorine atom, a methyl group, a trifluoro methyl group, or a trifluoro methoxy group as a substituent group,
- m is 0 or 1, and
- p and q are 0 or 1, provided that p+q is 0 or 1 b) 5 to 50% by weight of one or more compounds selected from the compound group B represented by general formulas BI to BXI and at least 3% by weight of the compounds in which $R^2$ and/or $R^3$ is/are an alkenyl group:

[CHEMICAL 2]

BXI

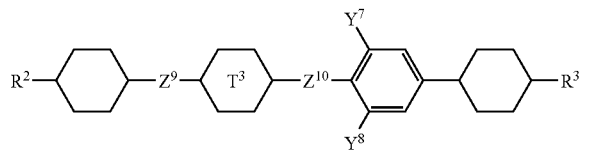

wherein:
- $R^2$ and $R^3$ are each, independently of one another, an alkyl group having 1 to 7 carbon atoms or an alkenyl group having 2 to 7 carbon atoms, in which, in addition, one or more methylene groups existing in the alkyl group or alkenyl group may be substituted each independently with an —O—, —COO— or —OCO— where O atoms are not directly linked to each other,
- $Z^6$ is —COO—, —OCO—, —CH$_2$O—, —OCH$_2$—, —CF$_2$O—, —OCF$_2$—, —C≡C—, or a single bond,
- $Z^7$ is —CH$_2$CH$_2$—, —COO—, —OCO—, —CH$_2$O—, —OCH$_2$—, —CF$_2$O—, —OCF$_2$—, or a single bond,
- $Z^8$ is —CH$_2$CH$_2$—, —CH=CH—, —COO—, —OCO—, —CH$_2$O—, —OCH$_2$—, —CF$_2$O—, —OCF$_2$—, or a single bond,
- $Z^9$ and $Z^{10}$ are each, independently of one another, —CH$_2$CH$_2$—, —COO—, —OCO—, or a single bond,
- $Y^7$ to $Y^{14}$ are each, independently of one another, a hydrogen atom, a methyl group, a fluorine atom, or a chlorine atom,
- rings $T^2$ and $T^3$ are each, independently of one another, a 1,4-phenylene group or a 1,4-cyclohexylene group, in which among these groups the 1,4-phenylene group may be unsubstituted or may have one or more of a fluorine atom, a chlorine atom, a methyl group, a trifluoro methyl group, or a trifluoro methoxy group as a substituent group, and
- n is 0 or 1;

characterized by the relative proportions of the above-mentioned compounds used in the nematic liquid crystal composition being determined to simultaneously obtain the following physical characteristics for the composition:

a nematic-isotropic liquid transition temperature ($T_{N-I}$) of the liquid crystal composition of greater than or equal to 60° C., a nematic temperature range ($\Delta T_N$) of the liquid crystal composition of greater than or equal to 70° C., a dielectric anisotropy of larger than or equal to $8\times10^{-11}$ F/m at 20° C., and a weak zenithal anchoring force on at least one of two substrates for a bistable nematic liquid crystal display that confine the composition, being defined by an anchoring breaking voltage $U_{\lambda/2}$ of less than or equal to 25 volts for a cell with a thickness (d) such that the product ($\Delta n \cdot d$) of the refractive index anisotropy ($\Delta n$) and the thickness (d) is 275 nm at 20° C.

2. A nematic liquid crystal compound comprising:
a) at least 20% by weight of one or more compounds selected from the compound group A represented by general formulas AI to AVI:

[CHEMICAL 3]

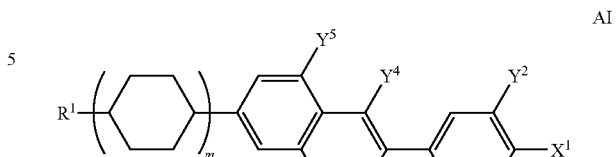

AI

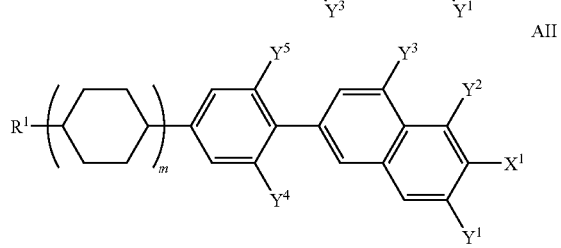

AII

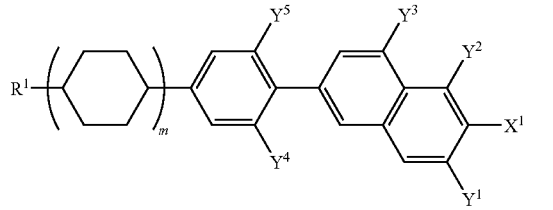

AIII

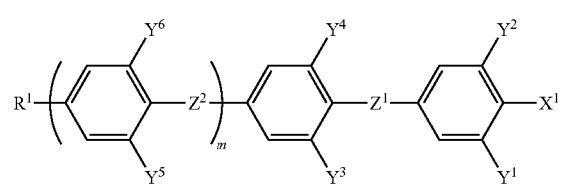

AIV

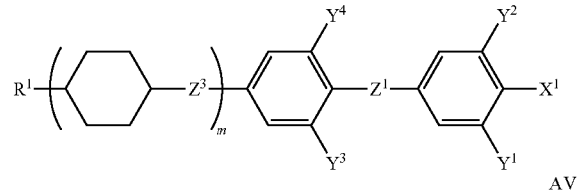

AV

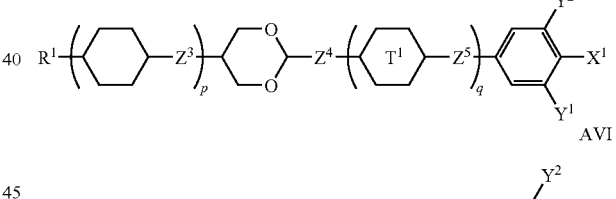

AVI

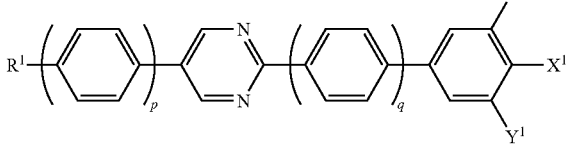

wherein:
- $R^1$ is an alkyl group or alkenyl group having 2 to 7 carbon atoms, in which, in addition, one or more methylene groups existing in the alkyl group or alkenyl group may be substituted each independently with an —O—, —COO— or —OCO— where O atoms are not directly linked to each other,
- $X^1$ is a cyano group, a fluorine atom, a chlorine atom, a trifluoro methyl group, a trifluoro methoxy group, or a difluoromethoxy group (—OCHF$_2$),
- $Z^1$ and $Z^2$ are each, independently of one another, —COO—, —OCO—, —CH$_2$O—, —OCH$_2$—, —CF$_2$O—, —OCF$_2$—, —C≡C—, or a single bond,
- $Z^3$ and $Z^4$ are each, independently of one another, —CH$_2$CH$_2$—, —COO—, —OCO—, —CH$_2$O—, —OCH$_2$—, —CF$_2$O—, —OCF$_2$—, or a single bond, $Z^5$ is —CH$_2$CH$_2$—, —CH═CH—, —COO—, —OCO—, —CH$_2$O—, —OCH$_2$—, —CF$_2$O—, —OCF$_2$—, or a single bond, $Y^1$ to $Y^6$ are each, independently of one another, a hydrogen atom, a fluorine atom, a chlorine atom, a trifluoro methyl group, or a trifluoro methoxy group, ring $T^1$ is a 1,4-phenylene group or a 1,4-cyclohexylene group, in which among these groups the 1,4-phenylene group may be unsubstituted or may have one or more of a fluorine atom, a chlorine atom, a methyl group, a trifluoro methyl group, or a trifluoro methoxy group as a substituent group, m is 0 or 1, and p and q are 0 or 1, provided that p+q is 0 or 1 b) 5 to 50% by weight of one or more compounds selected from the compound group B represented by general formulas BI to BXI and at least 3% by weight of the compounds in which $R^2$ and/or $R^3$ is/are an alkenyl group:

[CHEMICAL 4]

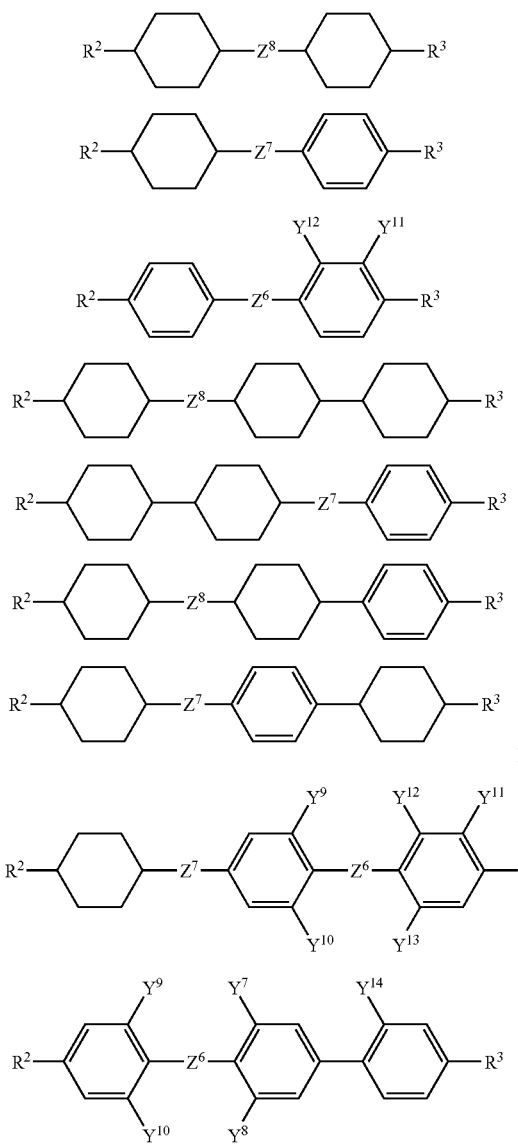

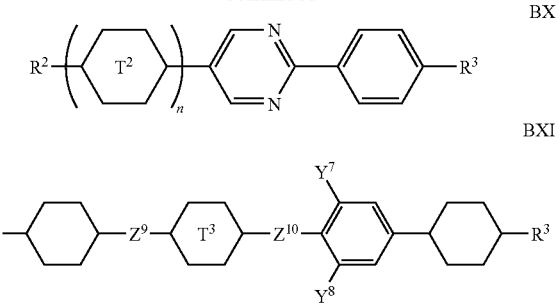

wherein:

$R^2$ and $R^3$ are each, independently of one another, an alkyl group having 1 to 7 carbon atoms or an alkenyl group having 2 to 7 carbon atoms, in which, in addition, one or more methylene groups existing in the alkyl group or alkenyl group may be substituted each independently with an —O—, —COO— or —OCO— where O atoms are not directly linked to each other, $Z^6$ is —COO—, —OCO—, —CH$_2$O—, —OCH$_2$—, —CF$_2$O—, —OCF$_2$—, —C≡C—, or a single bond, $Z^7$ is —CH$_2$CH$_2$—, —COO—, —OCO—, —CH$_2$O—, —OCH$_2$—, —CF$_2$O—, —OCF$_2$—, or a single bond, $Z^8$ is —CH$_2$CH$_2$—, —CH═CH—, —COO—, —OCO—, —CH$_2$O—, —OCH$_2$—, —CF$_2$O—, —OCF$_2$—, or a single bond, $Z^9$ and $Z^{10}$ are each, independently of one another, —CH$_2$CH$_2$—, —COO—, —OCO—, or a single bond, $Y^7$ to $Y^{14}$ are each, independently of one another, a hydrogen atom, a methyl group, a fluorine atom, or a chlorine atom, rings $T^2$ and $T^3$ are each, independently of one another, a 1,4-phenylene group or a 1,4-cyclohexylene group, in which among these groups the 1,4-phenylene group may be unsubstituted or may have one or more of a fluorine atom, a chlorine atom, a methyl group, a trifluoro methyl group, or a trifluoro methoxy group as a substituent group, and n is 0 or 1;

characterized by the relative proportions of the above-mentioned compounds used in the nematic liquid crystal composition being determined to simultaneously obtain the following physical characteristics for the composition:

a nematic-isotropic liquid transition temperature ($T_{N-I}$) of the liquid crystal composition of greater than or equal to 60° C., a nematic temperature range ($\Delta T_N$) of the liquid crystal composition of greater than or equal to 70° C., a dielectric anisotropy of larger than or equal to $8 \times 10^{-11}$ F/m at 20° C., and a weak zenithal anchoring force on at least one of two substrates for a bistable nematic liquid crystal display that confine the composition, being defined by an anchoring breaking voltage $U_{\lambda/2}$ of less than or equal to 25 volts for a cell with a thickness (d) such that the product ($\Delta n \cdot d$) of the refractive index anisotropy ($\Delta n$) and the thickness (d) is 275 nm at 20° C.

3. The nematic liquid crystal composition according to claim 1, wherein the dielectric anisotropy at 20° C. is $1.3 \times 10^{-10}$ F/m to $3.0 \times 10^{-10}$ F/m.

4. The nematic liquid crystal composition according to claim 1, wherein
in general formulas AI and AII, $X^1$ is a fluorine atom,
in general formula AIII, m represents 0, $Z^1$ represents —COO—, —OCO—, or a single bond, and $X^1$ is a cyano group,
in general formula AIV, m represents 1, and $Z^1$ and $Z^3$, independently of one another, represent —COO—, —OCO—, or a single bond, and $X^1$ is a cyano group,
in general formula AV, p and q represent 0 and 1, respectively, ring $T^1$ represents a 1,4-cyclohexylene group, $Z^4$ and $Z^5$, independently of one another, represent —CH$_2$CH$_2$—, or a single bond, and $X^1$ is a fluorine atom or a cyano group,
in general formula AVI, $X^1$ is a fluorine atom or a cyano group, and
in general formulas AI to AVI, $Y^1$ to $Y^6$, independently of one another, represent a hydrogen atom or a fluorine atom.

5. The nematic liquid crystal composition according to claim 1, characterized by containing at least 10% by weight of the compounds represented by the general formula BVI or BVIII.

6. A bistable nematic liquid crystal display comprising the nematic liquid crystal composition recited in claim 1 being situated between two substrates forming a cell and provided with alignment films and electrode structures on the inner sides of said substrates,
wherein at least one alignment film has a weak zenithal anchoring force defined by an anchoring breaking voltage $U_{\lambda/2}$ being less than or equal to 25 volts for a cell with a thickness (d) such that the product ($\Delta n \cdot d$) of the refractive index anisotropy ($\Delta n$) and the thickness (d) is 275 nm at 20° C., thereby permitting the liquid crystal composition to adopt at least two different stable states, and switching between the two stable states being achieved when a suitable electric signal is applied to said electrode structures.

7. The bistable nematic liquid crystal display according to claim 6, wherein the bistable nematic liquid crystal display is of an anchoring breaking type.

8. The bistable nematic liquid crystal display according to claim 6, wherein the device uses at least two stable textures, of which a first stable texture is uniform or slightly twisted in which the molecules of the liquid crystal composition are at least approximately parallel in the range of 0±20° to each other, and a second stable texture differs from the first by a twist of 180°±20°, with switching between the first stable texture and the second stable texture being achieved when a suitable electric signal is applied to said electrode structures.

9. The bistable nematic liquid crystal display according to claim 8, wherein the switching between the two stable textures is achieved by breaking the zenithal anchoring on at least one of the substrates.

10. The bistable nematic liquid crystal display according to claim 6, wherein the anchoring by the alignment films of the two substrates is monostable for both.

* * * * *